(12) United States Patent
Liu et al.

(10) Patent No.: US 11,357,009 B2
(45) Date of Patent: Jun. 7, 2022

(54) BEAM SELECTION METHOD, BASE STATION, AND USER EQUIPMENT

(71) Applicant: NTT DOCOMO, INC., Tokyo (JP)

(72) Inventors: Min Liu, Beijing (CN); Chongning Na, Beijing (CN); Xin Wang, Beijing (CN); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 44 days.

(21) Appl. No.: 16/637,783

(22) PCT Filed: Aug. 9, 2018

(86) PCT No.: PCT/CN2018/099681
§ 371 (c)(1),
(2) Date: Feb. 10, 2020

(87) PCT Pub. No.: WO2019/029635
PCT Pub. Date: Feb. 14, 2019

(65) Prior Publication Data
US 2020/0213993 A1    Jul. 2, 2020

(30) Foreign Application Priority Data

Aug. 10, 2017 (CN) .......................... 201710682216.4

(51) Int. Cl.
*H04W 72/04* (2009.01)
*H04W 8/24* (2009.01)

(52) U.S. Cl.
CPC .......... *H04W 72/048* (2013.01); *H04W 8/24* (2013.01); *H04W 72/046* (2013.01); *H04W 72/0413* (2013.01)

(58) Field of Classification Search
CPC . H04W 72/048; H04W 8/24; H04W 72/0413; H04W 72/046; H04W 72/085; H04W 40/06; H04W 16/28; H04B 7/0695
See application file for complete search history.

(56) References Cited

U.S. PATENT DOCUMENTS 9,906,284 B2    2/2018 Zhong et al.
10,009,083 B2   6/2018 Yang et al.
(Continued)

FOREIGN PATENT DOCUMENTS

CN    103688474 A    3/2014
CN    104734759 A    6/2015
(Continued)

OTHER PUBLICATIONS

International Search Report issued in PCT/CN2018/099681 dated Oct. 29, 2018 (7 pages).

(Continued)

*Primary Examiner* — Thai Nguyen
(74) *Attorney, Agent, or Firm* — Osha Bergman Watanabe & Burton LLP

(57) ABSTRACT

A beam selection method, a base station, and a user equipment are presented. The beam selection method performed by the base station includes: receiving transmission beam group information on the base station and information on receiving capability of a receiving set of a user equipment corresponding to each transmission beam group fed back by the user equipment, where the information on receiving capability of the receiving set is the number of reception beams that the user equipment can simultaneously form in the receiving set; and selecting transmission beams corresponding to the receiving set and used for transmitting information to the user equipment based at least in part on the transmission beam group information and the information on receiving capability of each receiving set.

18 Claims, 5 Drawing Sheets

(56) References Cited

U.S. PATENT DOCUMENTS

2014/0120926 A1    5/2014  Shin et al.
2015/0282122 A1*  10/2015  Kim .................... H04B 7/0408
                                                     370/329
2019/0074891 A1*   3/2019  Kwon ................... H04L 5/0023

FOREIGN PATENT DOCUMENTS

CN         106470062  A     3/2017
WO    WO-2016018121 A1 *   2/2016   ........... H04B 7/0634
WO    WO-2018025070 A1 *   2/2018   ........... H04B 7/0617

OTHER PUBLICATIONS

Written Opinion of the International Searching Authority issued in PCT/CN2018/099681 dated Oct. 29, 2018 (6 pages).

* cited by examiner

BEAM SELECTION METHOD, BASE STATION, AND USER EQUIPMENT

CROSS-REFERENCE TO RELATED APPLICATIONS

This application is a 371 U.S. National Phase of International Application No. PCT/CN2018/099681, filed on Aug. 9, 2018, which claims priority to Chinese Application No. 201710682216.4, filed on Aug. 10, 2017. The entire disclosures of the above applications are incorporated herein by reference.

TECHNICAL FIELD

The present disclosure relates to a field of mobile communication, and in particular, to a beam selection method performed in a communication system, and a corresponding base station and user equipment.

BACKGROUND

In a high-frequency scenario of 5G, or in a scenario where a User Equipment (UE) is connected to a 5G transmitting and receiving point (base station) or a Long-Term Evolution (LTE) base station through Dual Connectivity, it is proposed to use beamforming technology in the UE and the base station, that is, both the base station and the UE may use a plurality of beams to transmit and receive information.

The UE usually includes one or more transceiver panels, each of which may carry one or more transceiver units (TXRU) to transmit and receive signals, and each transceiver unit may form one or more transmission beams and one or more reception beams. For an analog beam supported by the 5G New Radio (NR), one transceiver unit (TXRU) of the UE can only form one beam to transmit or receive information at the same time. As a result, it is not possible to arbitrarily select beams from a plurality of beams for information transmission and reception between the base station and the user equipment. Therefore, in this case, the transmission beams of the base station need to be grouped, and the base station is enabled to select beams according to states of beam grouping and channel measurement results fed back by the UE. However, the above method does not enable the base station to acquire sufficient information on receiving states of the UE, thus affecting a selection and judgment on the beams by the base station, thereby resulting in an increase in system overhead and a reduction in information transmitting efficiency of the system.

SUMMARY OF THE INVENTION

According to one embodiment of the present disclosure, there is provided a beam selection method, which is performed by a base station and comprises: receiving transmission beam group information on the base station and information on receiving capability of a receiving set of a user equipment corresponding to each transmission beam group fed back by the user equipment, where the information on receiving capability of the receiving set is the number of reception beams that the user equipment can simultaneously form in the receiving set; and selecting transmission beams corresponding to the receiving set and used for transmitting information to the user equipment based at least in part on the transmission beam group information and the information on receiving capability of each receiving set.

According to another embodiment of the present disclosure, there is provided a beam selection method, which is performed by a user equipment and comprises: acquiring transmission beam group information on a base station and information on receiving capability of a receiving set of the user equipment corresponding to each transmission beam group, where the information on receiving capability of the receiving set is the number of reception beams that the user equipment can simultaneously form in the receiving set; and transmitting the transmission beam group information and the information on receiving capability, so that the base station selects transmission beams corresponding to the receiving set and used for transmitting information to the user equipment based at least in part on the transmission beam group information and the information on receiving capability of each receiving set.

According to another embodiment of the present disclosure, there is provided a base station, comprising: a receiving unit configured to receive transmission beam group information on the base station and information on receiving capability of a receiving set of a user equipment corresponding to each transmission beam group fed back by the user equipment, where the information on receiving capability of the receiving set is the number of reception beams that the user equipment can simultaneously form in the receiving set; and a selecting unit configured to select transmission beams corresponding to the receiving set and used for transmitting information to the user equipment based at least in part on the transmission beam group information and the information on receiving capability of each receiving set.

According to another embodiment of the present disclosure, there is provided a user equipment, comprising: an acquiring unit configured to acquire transmission beam group information on a base station and information on receiving capability of a receiving set of the user equipment corresponding to each transmission beam group, where the information on receiving capability of the receiving set is the number of reception beams that the user equipment can simultaneously form in the receiving set; and a transmitting unit configured to transmit the transmission beam group information and the information on receiving capability, so that the base station selects transmission beams corresponding to the receiving set and used for transmitting information to the user equipment based at least in part on the transmission beam group information and the information on receiving capability of each receiving set.

The beam selection method performed by the communication system and the corresponding base station and user equipment according to the embodiments of the present disclosure can enable the user equipment to report information on receiving capability of a receiving set corresponding to each transmission beam group of the base station, thereby enabling the base station to select corresponding transmission beams based at least in part on to the information on receiving capability of the user equipment. This beam selection method, base station and user equipment can significantly reduce system overhead and improve information transmitting efficiency of the system.

BRIEF DESCRIPTION OF THE DRAWINGS

The above and other objects, features, and advantages of the present disclosure will become clearer by describing the embodiments of the present disclosure in details with reference to the accompanying drawings. The accompanying drawings are used to provide a further understanding of the embodiments of the present disclosure, and constitute a part of the specification and are used to construct the present disclosure together with the embodiments of the present disclosure without constituting a limitation on the present disclosure. In the accompanying drawings, the same reference numerals generally represent the same components or steps.

DESCRIPTION OF THE EMBODIMENTS

In order to make the objectives, technical solutions, and advantages of the present disclosure clearer, exemplary embodiments according to the present disclosure will be described in details below with reference to the accompanying drawings. Obviously, the described embodiments are only a part of the embodiments of the present disclosure, rather than all embodiments of the present disclosure. It should be understood that the present disclosure is not limited by the exemplary embodiments described herein. Based on the embodiments of the present disclosure described in this disclosure, all other embodiments obtained by those skilled in the art without any creative effort should be contained in the protection scope of the present disclosure.

Figure 1:
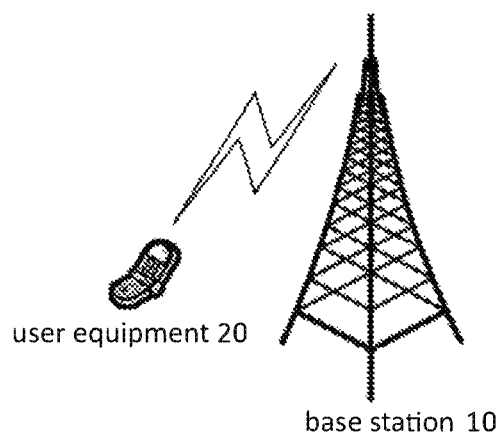
FIG. 1 is a schematic diagram of a mobile communication system according to embodiments of the present disclosure.

First, a wireless communication system according to embodiments of the present disclosure will be described with reference to FIG. 1. As shown in FIG. 1, the wireless communication system may include a base station 10 and a User Equipment (UE) 20. The UE 20 may receive a Physical Downlink Control Channel (PDCCH) and a Physical Downlink Shared Channel (PDSCH) transmitted by the base station 10. It should be recognized that although one base station and one UE are shown in FIG. 1, this is only schematic, and the wireless communication system may include one or more base stations and one or more UEs. Furthermore, the base station 10 may be a Transmitting and Receiving Point (TRP), or a plurality of TRPs may be managed by a same central processing unit. In the following, the terms "base station" and "TRP" may be used interchangeably.

Figure 2:
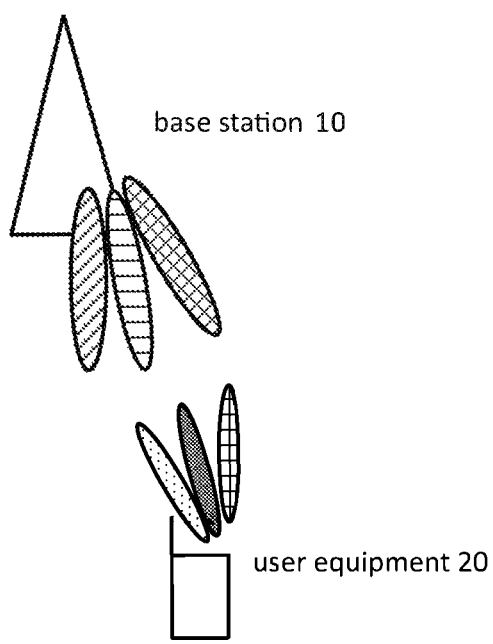
FIG. 2 is a schematic diagram illustrating beam transmission between a base station and a user equipment according to the embodiments of the present disclosure.

FIG. 2 shows a schematic diagram of beam transmission between a base station and a user equipment in the embodiments of the present disclosure. The base station 10 may have a plurality of transmission beams, so that one or more transmission beams may be used to transmit signals to the UE. On the other hand, the UE 20 may have a plurality of reception beams, so that one or more reception beams may be used to receive signals transmitted by the base station. Each reception beam of the UE 20 may correspond to one or more transmission beams of the base station 10, so that the UE 20 may utilize the reception beam to receive information transmitted by the base station through transmission beam(s) corresponding to the reception beam. The UE 20 may select transmission beam(s) corresponding to each of its reception beams according to channel measurement results for the transmission beams of the base station. For example, the UE 20 may select transmission beams whose receiving quality exceed a threshold as transmission beams corresponding to each of its reception beams.

As described above, in the 5G new air interface scenario, the UE needs to group the transmission beams of the base station according to states of the reception beams, so that the base station selects a part or all of the transmission beams in each transmission beam group to transmit information. However, even in a case of the above grouping, the base station still cannot acquire specific information on receiving capability of the user equipment. Therefore it may cause that the number of the transmission beams selected by the base station exceeds a corresponding receiving capability of the UE, thereby causing the case where information transmission partly or totally fails. Therefore, a method capable of improving information transmission efficiency of a base station and reducing system overhead need to be provided.

Figures 3, 4:
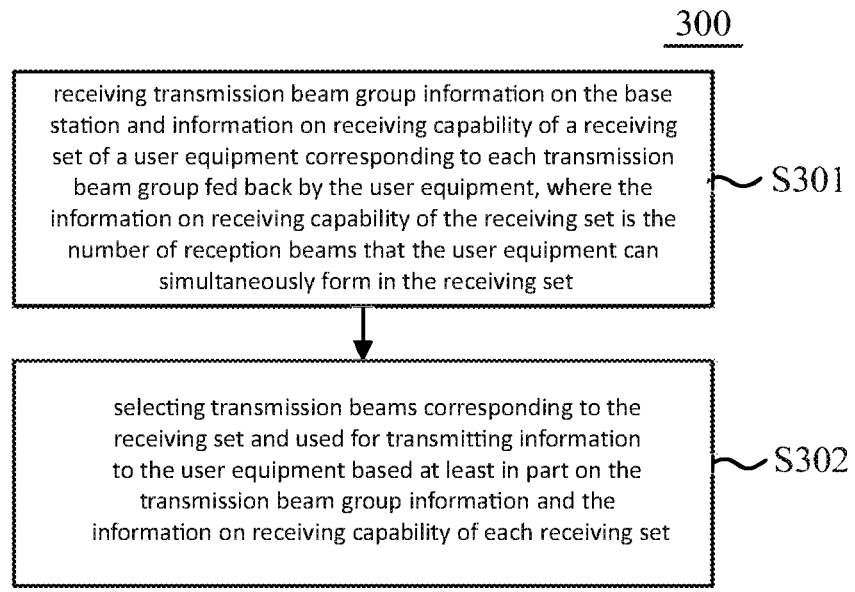
FIG. 3 is a flowchart of a beam selection method performed by a base station according to one embodiment of the present disclosure.
FIG. 4 is a schematic diagram of selecting transmission beams for feedback by using positions of reference signal resources according to one embodiment of the present disclosure.

Hereinafter, a beam selection method according to the embodiments of the present disclosure will be described. FIG. 3 shows a beam selection method performed by a base station according to the embodiments of the present disclosure. With this method, the base station may receive the specific information on receiving capability reported by the UE, so that the base station selects transmission beams according to the information on receiving capability of the UE.

As described above, the UE usually includes one or more transceiver panels, and each transceiver panel may carry one or more transceiver units (TXRU) to transmit and receive signals, and each transceiver unit may form one or more reception beams. The receiving capability of the UE may be grouped according to the transceiver panels, the reception beams, or other standards, thereby forming receiving sets. For example, the TXRUs of each transceiver panel of the UE may be set as one group, i.e., one receiving set. Alternatively, the reception beams that can be formed by the TXRUs of each transceiver panel may be set as one group, i.e., one receiving set. Alternatively, the reception beams that can be formed by all TXRUs on all the transceiver panels of the UE may be arbitrarily divided into a plurality of groups, i.e., each group is one receiving set. Alternatively, a part of the one or more transceiver panels (that is, a part of the TXRUs on the transceiver panel) of the UE may be used as one receiving set of the UE. The above examples of forming receiving sets do not constitute a specific limitation on the receiving sets of the UE. In practical application scenarios, an arbitrary division manner may be selected to divide the receiving sets of the UE.

The number of TXRUs or the number of reception beams in each receiving set of the UE represents the receiving capability of the UE, i.e., the number of reception beams that the UE can simultaneously form in the receiving set, and this number may be used as information on receiving capability of the receiving set. For example, in the case of grouping according to the transceiver panels, if one transceiver panel carries two TXRUs, it means that two reception beams can be formed simultaneously in the receiving set formed by the transceiver panel of the UE, to receive information transmitted by two transmission beams of the base station.

As shown in FIG. 3, in step S301, the transmission beam group information on the base station and the information on receiving capability of the receiving set of the user equipment corresponding to each transmission beam group fed back by the user equipment are received, where the information on receiving capability of the receiving set is the number of reception beams that the user equipment can simultaneously form in the receiving set.

Before this step, the base station may transmit signals to the UE by using the respective transmission beams. After receiving the signals transmitted by the base station through the respective transmission beams, the UE may perform a channel measurement on the respective transmission beams to determine channel quality corresponding to the respective transmission beams. Then, the transmission beams of the base station are grouped according to the channel measurement results of the UE on different transmission beams and states of the reception beams included in the UE. Specifically, the UE may select one or more reception beams in the range of each receiving set according to its different receiving sets and channel condition, and use the transmission beams corresponding to the one or more reception beams as a transmission beam group, and feed back information on the transmission beam group(s) to the base station.

Alternatively, the transmission beam group information fed back by the UE to the base station may include all pieces of the transmission beam group information, or a part of all pieces of the transmission beam group information may be reported; the transmission beam group information reported by the UE may include information on all the transmission beams in each transmission beam group, and may also include information on a part of transmission beams in all the transmission beams of one or more transmission beam groups. Alternatively, the transmission beam group information may include various information such as beam indices of the transmission beams, beam grouping states (for example, group numbers). For example, when the UE includes two transceiver panels in total and each transceiver panel carries two TXRUs, it may be considered that the UE has two receiving sets, and each receiving set includes two TXRUs. Therefore, the UE may divide all the transmission beams of the base station corresponding to the two reception beams that can be formed by the two TXRUs on each receiving set into one group, so that the UE may report two pieces of transmission beam group information to the base station, or may report one of the two pieces of transmission beam group information to the base station. For example, the UE may select and report one of the two pieces of transmission beam group information according to the channel condition. In one or more transmission beam groups, the UE may select a part of the transmission beams for reporting according to the channel measurement results. For example, the UE may select one group of transmission beams whose channel measurement results exceed a threshold to report to the base station. Furthermore, when the UE needs to feed back channel measurement results for different transmission beams to the base station, the method in the embodiment of the present disclosure may further include: the base station receiving the channel measurement results reported by the UE and corresponding to at least part of the transmission beams. Alternatively, the channel measurement results may include Reference Signal Receiving Powers (RSRPs), and/or Channel State Information (CSI) of L1 layer that is supported by the respective transmission beams, and the like.

Alternatively, the beam indices in the transmission beam group information reported by the UE may be determined according to the channel measurement results for the transmission beams. For example, the UE may first determine a reference transmission beam in one certain transmission beam group. For example, the UE may determine a reference transmission beam in one certain transmission beam group according to the channel measurement results (for example, RSRPs) of all transmission beams in the transmission beam group. Here, a beam with the best channel measurement result may be considered as the reference transmission beam. Of course, other preset standards may also be used to determine the reference transmission beam. Subsequently, at least part of transmission beams in the transmission beam group may be selected, and the beam indices of the at least part of transmission beams may be acquired, according to a spatial position relationship between other transmission beams in the transmission beam group and the reference transmission beam, and/or a relative position relationship between a reference signal resource mapping position for other transmission beams and a reference signal resource mapping position for the reference transmission beam. For example, when a RSRP measurement result of the reference transmission beam is the best, it may be considered that RSRP results of beams in proximity to the spatial position of the reference transmission beam are also good, and hence these beams may be selected as preferred transmission beams in the transmission beam group to be fed back to the base station. The spatial position proximity here may be considered that angles between the spatial azimuths of these preferred transmission beams and the reference transmission beam are small, for example, the angles may be less than a certain threshold. On this basis, considering that the base station generally configures beams close in spatial position on adjacent reference signal resource mapping positions during configuration. Therefore, in this case, other transmission beams in proximity to a position of reference signal resources of the reference beam may also be used as the preferred transmission beams for feedback. FIG. 4 shows a schematic diagram of selecting transmission beams for feedback by using positions of reference signal resources in one embodiment of the present disclosure. As shown in FIG. 4, different transmission beams are mapped to the respective resource mapping positions of a reference signal resource pool, i.e., the corresponding resources are allocated to different transmission beams, which are numbered as 1-16, respectively. In the base station configuration of the embodiment shown in FIG. 4, transmission beams corresponding to adjacent resource mapping positions are adjacent in spatial position, i.e., a beam 2 and a beam 3 are adjacent in spatial position, and a beam 6 and a beam 10 are also adjacent in spatial position. For the above transmission beams 1-16, the UE acquires that the transmission beam of the base station with the highest RSRP is a beam 7 through RSRP measurement. Therefore, the UE may define the beam 7 as the reference transmission beam and consider that RSRPs of beams 3, 6, 8, and 11 that are adjacent in spatial position are relatively high, and report the beams 7, 3, 6, 8, and 11 to the base station. In this case, the UE may report absolute numbers of the respective selected beams, such as 7, 3, 6, 8, 11. Alternatively, in order to save reporting overhead, the UE may also report relative values between indices of the respective beams and an index of the reference transmission beam, which is more meaningful for beam numbers with a large number of bits. For example, in an example where the reference transmission beam is 7, the UE may report that the foregoing beams are beams 7, −4, −1, 1, 4, and 4 in order to reduce the number of bits for reporting the transmission beam information. −4, −1, 1, and 4 are relative values of the indices of other beams relative to the reference beam, and the base station may determine the other beams through 7−4, 7−1, 7+1, and 7+4. In this case, the UE may set one bit in the report information to indicate the sign. For example, a value of 1 may be used to represent "+", and a value of 0 may be used to represent "−". Of course, the value of 0 may also be used to represent "+", and the value of 1 may also be used to represent "−". Moreover, remaining bits may be used to report absolute values of differences between the beam indices of the other transmission beams and the beam index of the reference transmission beam. For example, "4" in the foregoing beam relative number "−4" in FIG. 4 may be represented as "100". In this way, a relative number of a certain transmission beam and the reference transmission beam may be reported by a combination of a bit representing the sign and bits representing the absolute value of the difference between the beam indices, in order to reduce system overhead as much as possible. Of course, alternatively, the transmission beams for feedback may also be selected by comprehensively considering the spatial position relationship and a relative position relationship of the reference signal resource mapping positions between the other transmission beams and the reference transmission beam. After the UE determines the reference transmission beam and obtains the beam indices of the transmission beams that need to be reported accordingly, the UE needs to inform the base station of the reference transmission beam so that the base station can accurately acquire information on all the transmission beams fed back by the UE according to the reference transmission beam and the relative number from the reference transmission beam. For example, the UE may notify the base station of the reference transmission beam in an explicit manner, and alternatively, the UE may set one bit for each reported beam and use the bit to notify the base station whether the beam is the reference transmission beam. For example, a bit value of 1 may be used to represent that the beam is the reference transmission beam, and a bit value of 0 may be used to represent that the beam is not the reference transmission beam. Of course, the reverse is also possible. As another example, the UE may also notify the reference transmission beam in an implicit manner. For example, the UE and the base station may agree on that the first beam in a series of beams reported by the UE is the default reference transmission beam, and the other beams are the relative numbers relative to the reference transmission beam. The above description is only an example, and in practical applications, the reference transmission beam may be determined and the relative number corresponding to the reference transmission beam may be represented in any manner.

Alternatively, the information on receiving capability of the receiving set of the UE may be transmitted as one-time or long-period information. For example, when the information on receiving capability of each receiving set is the same, the information on receiving capability may be combined and reported only once, without reporting with each piece of different transmission beam group information, so as to maximize the system overhead savings. For another example, when the information on receiving capability of one or more receiving sets is different, it is needed to report different transmission beam groups and the information on receiving capability of the corresponding receiving sets.

In step S302, transmission beams corresponding to each receiving set and used for transmitting information to the user equipment are selected based at least in part on the transmission beam group information and the information on receiving capability of the receiving set.

In this step, alternatively, after acquiring information fed back by the UE, for example, including beam indices of the at least part of transmission beams in the transmission beam group, the base station may further select the transmission beams according to the transmission beam group information, the information on receiving capability of each receiving set and beam information on the at least part of the transmission beams in each transmission beam group. Considering that the UE does not expect the base station to transmit a signal to it for a certain receiving set by using transmission beams whose number is greater than a number indicated by the information on receiving capability of the receiving set, therefore, in the transmission beam group, the number of transmission beams selected by the base station and corresponding to one certain receiving set may be less than or equal to the number of reception beams that may be simultaneously formed in the receiving set. In other words, when a certain receiving set of the UE can only contain two TXRUs and therefore can only simultaneously form two reception beams, the UE may expect the base station to transmit information for this receiving set by using transmission beams whose number is less than or equal to 2. Only in this case can the UE be able to receive information on all the transmission beams transmitted by the base station. Alternatively, the base station may select according to the transmission beams included in the transmission beam group information fed back by the UE. For example, the base station may select transmission beams with higher RSRPs to transmit information according to the RSRP results reported by the UE. Alternatively, the base station may also select transmission beams that are not included in the transmission beam group fed back by the UE. For example, the base station may select transmission beams, which have a relatively close spatial position relationship and/or a relative position relationship of reference signal resource mapping positions with transmission beams which have higher RSRPs reported by the UE, to transmit information.

The base station may transmit beam indications to the UE after determining the selected transmission beams, to indicate to the UE related information on the transmission beams selected by the base station. Alternatively, when the number of transmission beams in the transmission beam group selected by the UE according to the information on receiving capability of its corresponding receiving set is different, the base station may also determine whether to transmit beam indication information accordingly, and may select different beam indication information to transmit when transmitting. For example, when the number of the at least part of transmission beams in the transmission beam group reported by the UE is less than or equal to the number of reception beams that can be simultaneously formed in the receiving set corresponding to the transmission beam group (i.e., the information on receiving capability of the receiving set), the base station can only select the transmission beams from the corresponding transmission beam group reported by the UE. Therefore, in this case, the number of transmission beams selected by the base station will not be greater than the information on receiving capability of the receiving set of the UE, and the UE can also ensure that it has the ability to receive the information transmitted by the base station through the corresponding transmission beams on the corresponding receiving set. Accordingly, the base station may not need to indicate to the UE the specific information on the transmission beams that it finally selects, and may only indicate information on the transmission beam group corresponding to the transmission beams that it selects. Alternatively, the UE may also make the number of the at least part of transmission beams in the reported transmission beam group greater than the number of reception beams that can be simultaneously formed in the receiving set corresponding to the transmission beam group. In this case, when the base station selects from these transmission beams, it may be necessary to inform the UE of information on the transmission beams that it selects and/or information on the transmission beam group to which the transmission beams belong, so that the UE can cooperate with the base station as much as possible to receive. Of course, the beam indications from the base station to the UE in the above different cases may be selected according to practical conditions.

For example, in one example, when the base station has selected transmission beams 1 and 3 in a transmission beam group (1) and transmission beam 4 in a transmission beam group (2), the base station may only inform the UE of the transmission beam groups (1) and (2) without informing the UE of beams 1, 3, and 4. Therefore, the base station may inform the UE of information on the transmission beam groups instead of information on specific transmission beams, so as to save system overhead.

In another example, when the information on receiving capability of a certain receiving set of the UE is 2, but the number of transmission beams in the reported transmission beam group corresponding to the receiving set is 4 (for example, beams 5, 6, 7, 8), the base station may need to select 2 of the 4 transmission beams to transmit information to ensure that it is within the corresponding receiving capability of the receiving set of the UE. For example, the base station may select transmission beams 5 and 7. In this case, the base station needs to inform the UE of information on the selected transmission beams. As described above, the base station may choose to inform the UE of information on all the transmission beams, i.e., the base station informs the UE that the transmission beams selected by the base station are the beam 5 and the beam 7, respectively, and the system overhead for this method is large. Alternatively, the base station may also combine the four beams reported by the UE according to the information on receiving capability of this receiving set of the UE, and each combination may include beams whose number is equal to or less than the number of pieces of information on receiving capability of the corresponding receiving set. For example, in this example, the number of pieces of information on receiving capability of this receiving set is 2. Therefore, it may be set that a combination 1 includes beams 5 and 6 (two beams), a combination 2 includes beams 7 and 8, a combination 3 includes beams 5 and 7, and a combination 4 includes beams 6 and 8. The combination relationship described above may be stored in advance by both the base station and the UE, or may be notified to the UE by the base station in advance through signaling. After that, when the base station selects the beams 5 and 7, it is only necessary to inform the UE that the currently selected combination is the combination 3. With this combined beam indication transmitting method, the system overhead may be further saved.

Alternatively, when the base station transmits to the UE information indicating the transmission beam group to which the transmission beams belong only according to the selected transmission beams, since the UE cannot accurately acquire a specific state of the transmission beams selected by the base station, information may be received by polling on different time slots and/or resource units. For example, the base station and the UE may agree on a manner of transmitting and receiving information in advance through, for example, signaling. The signaling may be MAC CE signaling, or may be RRC signaling, or a DCI indication. Specifically, the base station may transmit information with different transmission beams on different time slots and/or resource unit positions, while the UE may receive information with different reception beams corresponding to the transmission beam group sequentially on different time slots and/or resource units according to the agreement after receiving the corresponding transmission beam group information indicated by the base station. Further, the UE may also perform channel measurement according to the information receiving status, and can acquire which case has a better channel quality on different time slots and/or resource units, and feed back the measurement results to the base station, so that the base station selects the transmission beams for transmitting information according to the channel measurement results of the UE as much as possible.

Figure 5:
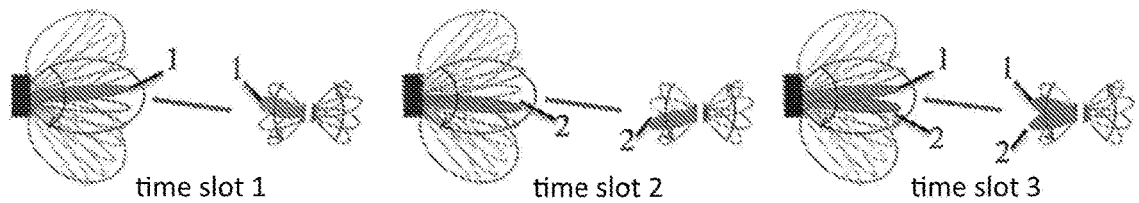
FIG. 5 is a schematic diagram of information transmission between a base station and a UE according to one embodiment of the present disclosure.

FIG. 5 shows a state of information transmission between the base station and the UE according to one example of the present disclosure. As shown in FIG. 5, a transmission beam group (3) composed of transmission beams 1 and 2 of the base station corresponds to a receiving set 1 of the UE. The receiving set 1 may generate two reception beams 1 and 2 at the same time to receive the information transmitted by corresponding transmission beams of the base station. When the base station expects to use the transmission beams in the transmission beam group (3) to transmit information, it only informs the UE of the transmission beam group information, and does not accurately inform the UE which transmission beam of the transmission beams 1 and 2 will be used for transmitting. In this case, the base station and the UE will agree on: in time slot 1, the base station transmits information through the transmission beam 1, and the UE receives through the reception beam 1; in time slot 2, the base station transmits information through the transmission beam 2, and the UE receives through the reception beam 2; and in time slot 3, the base station transmits information through the transmission beams 1 and 2 together, and the UE receives through the reception beams 1 and 2 together. In this way, no matter the base station selects which transmission beam or transmission beams to transmit, the UE can select corresponding reception beams at a corresponding time point to accurately receive information. Of course, the base station may also transmit information through the transmission beam 1 only in the time slot 1, and the UE will accordingly receive the information through the reception beam 1 only in the time slot 1. Further, the UE may also perform a channel measurement according to the information receiving status, and can acquire which case has the best channel quality in the 3 time slots (for example, the timeslot 1), and feed back the measurement results to the base station, so that the base station selects the transmission beam 1 for transmitting information in the time slot 1 according to the channel measurement results of the UE as much as possible.

Alternatively, the base station may also transmit information with the same transmission beams on different timeslots and/or resource unit positions within an agreed time period, and the UE may receive information with different reception beams corresponding to the transmission beam group sequentially on different time slots and/or resource units according to the agreement, after receiving the corresponding transmission beam group information indicated by the base station. Further, the UE may also perform channel measurement according to the information receiving status, and can acquire which case has a better channel quality on different time slots and/or resource units, and select the corresponding reception beams to receive information according to the channel measurement results as much as possible.

Figure 6:
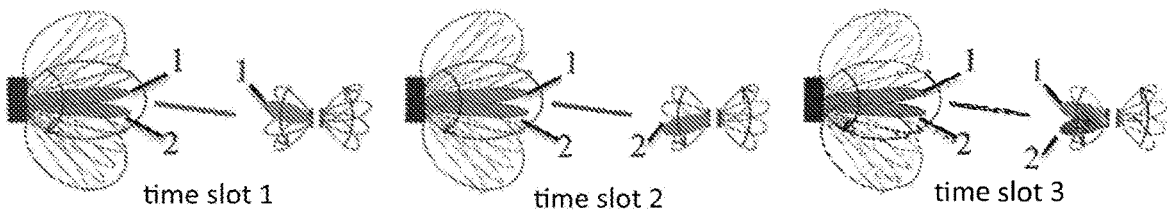
FIG. 6 is a schematic diagram of information transmission between a base station and a UE according to another embodiment of the present disclosure.

FIG. 6 shows a state of information transmission between the base station and the UE according to another example of the present disclosure. Similar to FIG. 5, the transmission beam group (3) composed of the transmission beams 1 and 2 of the base station corresponds to the receiving set 1 of the UE. The receiving set 1 may generate two reception beams 1 and 2 at the same time to receive the information transmitted by the corresponding transmission beams of the base station. When the base station expects to use the transmission beams in the transmission beam group (3) to transmit information, it only informs the UE of the transmission beam group information, and does not accurately inform the UE which transmission beam of the transmission beams 1 and 2 will be used for transmitting. The difference from FIG. 5 is that the base station will only transmit information in one of the manners. For example, the base station may only transmit information through the transmission beams 1 and 2 together within a preset period of time, while the UE will use different reception beams to receive information, respectively, in this corresponding period of time. For example, in the time slot 1, the UE receives through the reception beam 1; in time slot 2, the UE receives through the reception beam 2; and in time slot 3, the UE receives through the reception beams 1 and 2 together. In this case, no matter the base station uses which manner to transmit, the UE will use different reception beams to receive information in turn, thereby ensuring that the UE can always receive information with a good quality in a certain period. Alternatively, the UE may also perform a channel measurement according to the information receiving status during this process, and can acquire which case has the best channel quality in the 3 time slots (for example, the time slot 3), and use the reception beams 1 and 2 with the best channel quality together to receive information transmitted by the base station.

The beam selection method performed by the base station provided according to the embodiments of the present disclosure can enable the user equipment to report the information on receiving capability of the receiving set corresponding to each transmission beam group of the base station, so that the base station can select the corresponding transmit beams based at least in part on the information on receiving capability of the user equipment. This beam selection method can significantly reduce the system overhead and improve the information transmission efficiency of the system.

Figure 7:
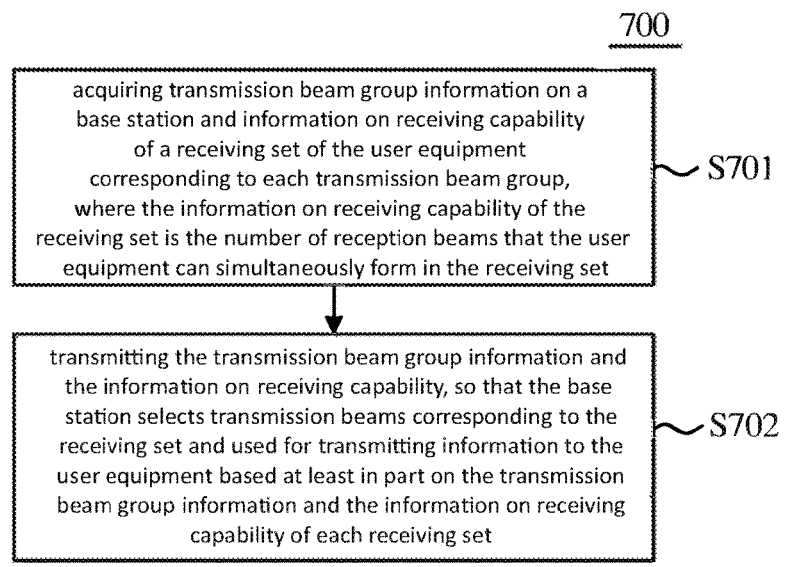
FIG. 7 is a flowchart of a beam selection method performed by a user equipment according to one embodiment of the present disclosure.

Hereinafter, a beam selection method according to the embodiments of the present disclosure will be described, and FIG. 7 shows the beam selection method performed by a UE according to the embodiments of the present disclosure. With this method, the UE may report information on its specific receiving capability to a base station, so that the base station selects transmission beams according to the information on receiving capability of the UE.

As shown in FIG. 7, in step S701, transmission beam group information on a base station and information on receiving capability of a receiving set of the user equipment corresponding to each transmission beam group are acquired, where the information on receiving capability of the receiving set is the number of reception beams that the user equipment can simultaneously form in the receiving set.

The receiving set of the UE may be a transceiver panel in the UE, i.e., a panel, and the transceiver panel may respectively carry one or more TXRUs to transmit and receive information. In the embodiments of the present disclosure, the number of TXRUs carried on one receiving set of the UE may be used as the information on receiving capability of the receiving set of the UE, i.e., the number of reception beams that the UE can simultaneously form in the receiving set is used as the information on receiving capability of the receiving set. For example, if two TXRUs are carried on one transceiver panel of the UE, it means that two reception beams can be formed simultaneously in the receiving set formed by the transceiver panel of the UE, to receive information transmitted by the two corresponding transmission beams of the base station. Of course, the receiving set of the UE may also have other representations. For example, a specific part of one or more transceiver panels of the UE may be used as one receiving set of the UE. For another example, a combination of any part of the reception beams of the UE may be formed into one receiving set of the UE, and the number of reception beams that the UE can simultaneously form in this receiving set is the information on receiving capability of this receiving set. The above example of the receiving set does not constitute a specific limitation on the receiving set of the UE. In practical application scenarios, an arbitrary division manner may be selected to divide the receiving sets of the UE.

Before this step, the base station may transmit signals to the UE with respective transmission beams. After receiving the signals transmitted by the base station through the respective transmission beams, the UE may perform a channel measurement on the respective transmission beams to determine channel quality corresponding to the respective transmission beams. Then, the transmission beams of the base station are grouped according to the channel measurement results of the UE on different transmission beams and states of the reception beams included in the UE. Specifically, the UE may select one or more reception beams in the range of each receiving set according to its different receiving sets and channel condition, and use the transmission beams corresponding to the one or more reception beams as a transmission beam group. The transmission beam group determined by the UE corresponds to the receiving set of the UE.

Alternatively, the transmission beam group information acquired by the UE may include various information such as beam indices of the transmission beams, beam grouping states (for example, group numbers). The transmission beam group information acquired by the UE may include information on all the transmission beams in each transmission beam group, and may also include information on a part of all the transmission beams of one or more transmission beam groups. Alternatively, the transmission beam group information may include various information such as beam indices of the transmission beams, beam grouping states (for example, group numbers). For example, when the UE includes two transceiver panels in total, it may be considered that the UE has two receiving sets, and each receiving set includes two TXRUs. Therefore, the UE may divide all the transmit beams of base stations corresponding to the two receive beams preferred by the two TXRUs on each receiving set into one group, and obtain two groups of transmission beam group information in total, or may report one piece of the transmission beam group information to the base station. For example, the UE may select and report one piece of the transmission beam group information according to the channel condition. The UE may select a part of the transmission beams in one or more transmission beam groups according to the channel measurement results. For example, the UE may select information on one group of transmission beams in a certain transmission beam group whose channel measurement results exceed a threshold as the transmission beam group information for the transmission beam group.

Alternatively, the beam indices in the transmission beam group information may be determined according to the channel measurement results for the transmission beams. For example, the UE may first determine a reference transmission beam in one certain transmission beam group. For example, the UE may determine a reference transmission beam in one certain transmission beam group according to the channel measurement results (for example, RSRPs) of all transmission beams in the transmission beam group. Here, a beam with the best channel measurement result may be considered as the reference transmission beam. Of course, other preset standards may also be used to determine the reference transmission beam. Subsequently, at least part of transmission beams in the transmission beam group may be selected, and the beam indices of the at least part of transmission beams may be acquired, according to a spatial position relationship between other transmission beams in the transmission beam group and the reference transmission beam, and/or a relative position relationship between a reference signal resource mapping position for other transmission beams and a reference signal resource mapping position for the reference transmission beam. For example, when a RSRP measurement result of the reference transmission beam is the best, it may be considered that RSRP results of beams in proximity to the spatial position of the reference transmission beam are also good, and hence these beams may be selected as preferred transmission beams in the transmission beam group to be fed back to the base station. The spatial position proximity here may be considered that angles between the spatial azimuths of these preferred transmission beams and the reference transmission beam are small, for example, the angles may be less than a certain threshold. On this basis, considering that the base station generally configures beams close in spatial position on adjacent reference signal resource mapping positions during configuration. Therefore, in this case, other transmission beams in proximity to a position of reference signal resources of the reference beam may also be used as the preferred transmission beams for feedback. FIG. 4 shows a schematic diagram of selecting transmission beams for feedback by using positions of reference signal resources in one embodiment of the present disclosure. As shown in FIG. 4, different transmission beams are mapped to the respective resource mapping positions of a reference signal resource pool, i.e., the corresponding resources are allocated to different transmission beams, which are numbered as 1-16, respectively. In the base station configuration of the embodiment shown in FIG. 4, transmission beams corresponding to adjacent resource mapping positions are adjacent in spatial position, i.e., a beam 2 and a beam 3 are adjacent in spatial position, and a beam 6 and a beam 10 are also adjacent in spatial position. For the above transmission beams 1-16, the UE acquires that the transmission beam of the base station with the highest RSRP is a beam 7 through RSRP measurement. Therefore, the UE may define the beam 7 as the reference transmission beam and consider that RSRPs of beams 3, 6, 8, and 11 that are adjacent in spatial position are relatively high, and report the beams 7, 3, 6, 8, and 11 to the base station. In this case, the UE may report absolute numbers of the respective selected beams, such as 7, 3, 6, 8, 11. Alternatively, in order to save reporting overhead, the UE may also report relative values between indices of the respective beams and an index of the reference transmission beam, which is more meaningful for beam numbers with a large number of bits. For example, in an example where the reference transmission beam is 7, the UE may report that the foregoing beams are beams 7, −4, −1, 1, 4, and 4 in order to reduce the number of bits for reporting the transmission beam information. −4, −1, 1, and 4 are relative values of the indices of other beams relative to the reference beam, and the base station may determine the other beams through 7−4, 7−1, 7+1, and 7+4. In this case, the UE may set one bit in the report information to indicate the sign. For example, a value of 1 may be used to represent "+", and a value of 0 may be used to represent "−". Of course, the value of 0 may also be used to represent "+", and the value of 1 may also be used to represent "−". Moreover, remaining bits may be used to report absolute values of differences between the beam indices of the other transmission beams and the beam index of the reference transmission beam. For example, "4" in the foregoing beam relative number "−4" in FIG. 4 may be represented as "100". In this way, a relative number of a certain transmission beam and the reference transmission beam may be reported by a combination of a bit representing the sign and bits representing the absolute value of the difference between the beam indices, in order to reduce system overhead as much as possible. Of course, alternatively, the transmission beams for feedback may also be selected by comprehensively considering the spatial position relationship and a relative position relationship of the reference signal resource mapping positions between the other transmission beams and the reference transmission beam. The above description is only an example, and in practical applications, the reference transmission beam may be determined and the relative number to the reference transmission beam may be represented in any manner.

In step S702, the transmission beam group information and the information on receiving capability are transmitted, so that the base station selects the transmission beams corresponding to each receiving set and used for transmitting information to the user equipment based at least in part on the transmission beam group information and the information on receiving capability of the receiving set.

Alternatively, the UE may report all pieces of the transmission beam group information to the base station, or may report a part of all pieces of the transmission beam group information according to, for example, channel conditions, where the UE may report information on one or more transmission beam groups with better channel quality to the base station.

Alternatively, when the UE needs to feed back channel measurement results for different transmission beams to the base station, the method in the embodiments of the present disclosure may further include reporting channel measurement results corresponding to the at least part of transmission beams. Alternatively, the channel measurement results may include Reference Signal Receiving Powers (RSRPs), and/or Channel State Information (CSI) of L1 layer that is supported by the respective transmission beams, and the like.

In addition, in the example of selecting the reference transmission beam and feeding back the beam indices as shown in FIG. 4, after the UE determines the reference transmission beam and obtains the beam indices of the transmission beams that need to be reported accordingly, the UE further needs to inform the base station that which transmission beam is the reference transmission beam so that the base station can accurately acquire information on all the transmission beams fed back by the UE according to the reference transmission beam and the relative number from the reference transmission beam. For example, the UE may notify the base station of the reference transmission beam in an explicit manner, and alternatively, the UE may set one bit for each reported beam and use the bit to notify the base station whether the beam is the reference transmission beam. For example, a bit value of 1 may be used to represent that the beam is the reference transmission beam, and a bit value of 0 may be used to represent that the beam is not the reference transmission beam. Of course, the reverse is also possible. As another example, the UE may also notify the reference transmission beam in an implicit manner. For example, the UE and the base station may agree on that the first beam in a series of beams reported by the UE is the default reference transmission beam, and the other beams are the relative numbers relative to the reference transmission beam.

Alternatively, the information on receiving capability of the receiving set of the UE may be transmitted as one-time or long-period information. For example, when the information on receiving capability of each receiving set is the same, the information on receiving capability may be combined and reported only once, without reporting with each piece of different transmission beam group information, so as to maximize the system overhead savings. For another example, when the information on receiving capability of one or more receiving sets is different, it is needed to report different transmission beam groups and the information on receiving capability of the corresponding receiving sets.

Alternatively, after acquiring information fed back by the UE, for example, including beam indices of the at least part of transmission beams in the transmission beam group, the base station may further select the transmission beams according to the transmission beam group information, the information on receiving capability of each receiving set and beam information on the at least part of the transmission beams in each transmission beam group. Considering that the UE does not expect the base station to transmit a signal to it for a certain receiving set by using transmission beams whose number is greater than a number indicated by the information on receiving capability of the receiving set, therefore, in the transmission beam group, the number of transmission beams selected by the base station and corresponding to one certain receiving set may be less than or equal to the number of reception beams that may be simultaneously formed in the receiving set. In other words, when a certain receiving set of the UE can only contain two TXRUs and therefore can only simultaneously form two reception beams, the UE may expect the base station to transmit information for this receiving set by using transmission beams whose number is less than or equal to 2. Only in this case can the UE be able to receive information on all the transmission beams transmitted by the base station. Alternatively, the base station may select according to the transmission beams included in the transmission beam group information fed back by the UE. For example, the base station may select transmission beams with higher RSRPs to transmit information according to the RSRP results reported by the UE. Alternatively, the base station may also select transmission beams that are not included in the transmission beam group fed back by the UE. For example, the base station may select transmission beams, which have a relatively close spatial position relationship and/or a relative position relationship of reference signal resource mapping positions with transmission beams which have higher RSRPs reported by the UE, to transmit information.

The UE may acquire related information on the transmission beams selected by the base station according to beam indications transmitted by the base station. Alternatively, when the number of transmission beams in the transmission beam group selected by the UE according to the information on receiving capability of its corresponding receiving set is different, the base station may also determine whether to transmit beam indication information accordingly, and may select different beam indication information to transmit when transmitting. For example, when the number of the at least part of transmission beams in the transmission beam group reported by the UE is less than or equal to the number of reception beams that can be simultaneously formed in the receiving set corresponding to the transmission beam group (i.e., the information on receiving capability of the receiving set), the base station can only select the transmission beams from the corresponding transmission beam group reported by the UE. Therefore, in this case, the number of transmission beams selected by the base station will not be greater than the information on receiving capability of the receiving set of the UE, and the UE can also ensure that it has the ability to receive the information transmitted by the base station through the corresponding transmission beams on the corresponding receiving set. Accordingly, the base station may not need to indicate to the UE the specific information on the transmission beams that it finally selects, and may only indicate information on the transmission beam group corresponding to the transmission beams that it selects. Alternatively, the UE may also make the number of the at least part of transmission beams in the reported transmission beam group greater than the number of reception beams that can be simultaneously formed in the receiving set corresponding to the transmission beam group. In this case, when the base station selects from these transmission beams, it may be necessary to inform the UE of information on the transmission beams that it selects and/or information on the transmission beam group to which the transmission beams belong, so that the UE can cooperate with the base station as much as possible to receive. Of course, the beam indications from the base station to the UE in the above different cases may be selected according to practical conditions.

For example, in one example, when the base station has selected transmission beams 1 and 3 in a transmission beam group (1) and transmission beam 4 in a transmission beam group (2), the base station may only inform the UE of the transmission beam groups (1) and (2) without informing the UE of beams 1, 3, and 4. Therefore, the base station may inform the UE of information on the transmission beam groups instead of information on specific transmission beams, so as to save system overhead.

In another example, when the information on receiving capability of a certain receiving set of the UE is 2, but the number of transmission beams in the reported transmission beam group corresponding to the receiving set is 4 (for example, beams 5, 6, 7, 8), the base station may need to select 2 of the 4 transmission beams to transmit information to ensure that it is within the corresponding receiving capability of the receiving set of the UE. For example, the base station may select transmission beams 5 and 7. In this case, the base station needs to inform the UE of information on the selected transmission beams. As described above, the base station may choose to inform the UE of information on all the transmission beams, i.e., the base station informs the UE that the transmission beams selected by the base station are the beam 5 and the beam 7, respectively, and the system overhead for this method is large. Alternatively, the base station may also combine the four beams reported by the UE according to the information on receiving capability of this receiving set of the UE, and each combination may include beams whose number is equal to or less than the number of pieces of information on receiving capability of the corresponding receiving set. For example, in this example, the number of pieces of information on receiving capability of this receiving set is 2. Therefore, it may be set that a combination 1 includes beams 5 and 6 (two beams), a combination 2 includes beams 7 and 8, a combination 3 includes beams 5 and 7, and a combination 4 includes beams 6 and 8. The combination relationship described above may be stored in advance by both the base station and the UE, or may be notified to the UE by the base station in advance through signaling. After that, when the base station selects the beams 5 and 7, it is only necessary to inform the UE that the currently selected combination is the combination 3. With this combined beam indication transmitting method, the system overhead may be further saved.

Alternatively, when the base station transmits to the UE information indicating the transmission beam group to which the transmission beams belong only according to the selected transmission beams, since the UE cannot accurately acquire a specific state of the transmission beams selected by the base station, information may be received by polling on different time slots and/or resource units. For example, the base station and the UE may agree on a manner of transmitting and receiving information in advance through, for example, signaling. The signaling may be MAC CE signaling, or may be RRC signaling, or a DCI indication. Specifically, the base station may transmit information with different transmission beams on different time slots and/or resource unit positions, while the UE may receive information with different reception beams corresponding to the transmission beam group sequentially on different time slots and/or resource units according to the agreement after receiving the corresponding transmission beam group information indicated by the base station. Further, the UE may also perform channel measurement according to the information receiving status, and can acquire which case has a better channel quality on different time slots and/or resource units, and feed back the measurement results to the base station, so that the base station selects the transmission beams for transmitting information according to the channel measurement results of the UE as much as possible.

FIG. 5 shows a state of information transmission between the base station and the UE according to one example of the present disclosure. As shown in FIG. 5, a transmission beam group (3) composed of transmission beams 1 and 2 of the base station corresponds to a receiving set 1 of the UE. The receiving set 1 may generate two reception beams 1 and 2 at the same time to receive the information transmitted by corresponding transmission beams of the base station. When the base station expects to use the transmission beams in the transmission beam group (3) to transmit information, it only informs the UE of the transmission beam group information, and does not accurately inform the UE which transmission beam of the transmission beams 1 and 2 will be used for transmitting. At this time, the base station and the UE will agree on: in time slot 1, the base station transmits information through the transmission beam 1, and the UE receives through the reception beam 1; in time slot 2, the base station transmits information through the transmission beam 2, and the UE receives through the reception beam 2; and in time slot 3, the base station transmits information through the transmission beams 1 and 2 together, and the UE receives through reception beams 1 and 2 together. In this way, no matter the base station selects which transmission beam or transmission beams to transmit, the UE can select corresponding reception beams at a corresponding time point to accurately receive information. Of course, the base station may also transmit information through the transmission beam 1 only in the time slot 1, and the UE will accordingly receive the information through the reception beam 1 only in the time slot 1. Further, the UE may also perform a channel measurement according to the information receiving status, and can acquire which case has the best channel quality in the 3 time slots (for example, the timeslot 1), and feed back the measurement results to the base station, so that the base station selects the transmission beam 1 for transmitting information in the time slot 1 according to the channel measurement results of the UE as much as possible.

Alternatively, the base station may also transmit information with the same transmission beams on different timeslots and/or resource unit positions within an agreed time period, and the UE may receive information with different reception beams corresponding to the transmission beam group sequentially on different time slots and/or resource units according to the agreement, after receiving the corresponding transmission beam group information indicated by the base station. Further, the UE may also perform channel measurement according to the information receiving status, and can acquire which case has a better channel quality on different time slots and/or resource units, and select the corresponding reception beams to receive information according to the channel measurement results as much as possible.

FIG. 6 shows a state of information transmission between the base station and the UE according to another example of the present disclosure. Similar to FIG. 5, the transmission beam group (3) composed of the transmission beams 1 and 2 of the base station corresponds to the receiving set 1 of the UE. The receiving set 1 may generate two reception beams 1 and 2 at the same time to receive the information transmitted by the corresponding transmission beams of the base station. When the base station expects to use the transmission beams in the transmission beam group (3) to transmit information, it only informs the UE of the transmission beam group information, and does not accurately inform the UE which transmission beam of the transmission beams 1 and 2 will be used for transmitting. The difference from FIG. 5 is that the base station will only transmit information in one of the manners. For example, the base station may only transmit information through the transmission beams 1 and 2 together within a preset period of time, while the UE will use different reception beams to receive information, respectively, in this corresponding period of time. For example, in the time slot 1, the UE receives through the reception beam 1; in time slot 2, the UE receives through the reception beam 2; and in time slot 3, the UE receives through the reception beams 1 and 2 together. In this case, no matter the base station uses which manner to transmit, the UE will use different reception beams to receive information in turn, thereby ensuring that the UE can always receive information with a good quality in a certain period. Alternatively, the UE may also perform a channel measurement according to the information receiving status during this process, and can acquire which case has the best channel quality in the 3 time slots (for example, the time slot 3), and use the reception beams 1 and 2 with the best channel quality together to receive information transmitted by the base station.

The beam selection method performed by the user equipment provided according to the embodiments of the present disclosure can enable the user equipment to report the information on receiving capability of the receiving set corresponding to each transmission beam group of the base station, so that the base station can select the corresponding transmission beams based at least in part on the information on receiving capability of the user equipment. This beam selection method can significantly reduce the system overhead and improve the information transmission efficiency of the system.

Hereinafter, a base station according to the embodiments of the present invention is described with reference to FIG. 8. The base station may perform the beam selection method described above. Since operations of the base station is substantially the same as each step of the beam selection method described in FIG. 3, it is only briefly described here, and repeated description of the same content is omitted.

Figure 8:
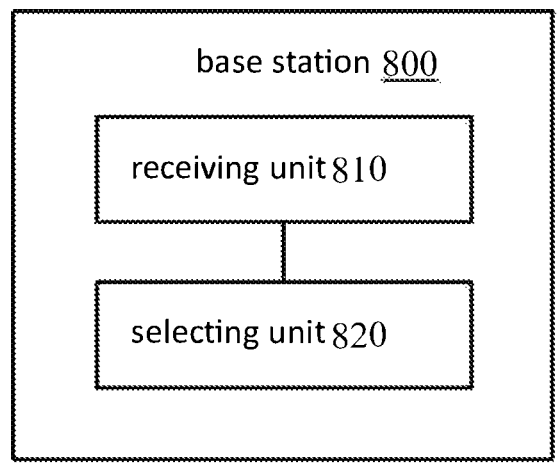
FIG. 8 is a structural block diagram of a base station according to one embodiment of the present disclosure.

As shown in FIG. 8, the base station 800 may include a receiving unit 810 and a selecting unit 820. It should be recognized that FIG. 8 only shows components related to the embodiments of the present invention, and other components are omitted, but this is only schematic, and the base station 800 may include other components as needed.

The receiving unit 810 receives transmission beam group information on the base station and information on receiving capability of a receiving set of a user equipment corresponding to each transmission beam group fed back by the user equipment, where the information on receiving capability of the receiving set is the number of reception beams that the user equipment can simultaneously form in the receiving set.

The receiving set of the UE may be a transceiver panel in the UE, i.e., a panel, and the transceiver panel may respectively carry one or more TXRUs to transmit and receive information. In the embodiments of the present disclosure, the number of TXRUs carried on one receiving set of the UE may be used as the information on receiving capability of the receiving set of the UE, i.e., the number of reception beams that the UE can simultaneously form in the receiving set is used as the information on receiving capability of the receiving set. For example, if two TXRUs are carried on one transceiver panel of the UE, it means that a receiving set formed by the transceiver panel of the UE can simultaneously form two reception beams to receive information transmitted by the two corresponding transmission beams of the base station. Of course, the receiving set of the UE may also have other representations. For example, a specific part of one or more transceiver panels of the UE may be used as one receiving set of the UE. For another example, a combination of any part of the reception beams of the UE may be formed into one receiving set of the UE, and the number of reception beams that the UE can simultaneously form in this receiving set is the information on receiving capability of this receiving set. The above example of the receiving set does not constitute a specific limitation on the receiving set of the UE. In practical application scenarios, an arbitrary division manner may be selected to divide the receiving set of the UE.

In this embodiment, the base station 800 may further include a transmitting unit (not shown). The transmitting unit may transmit signals to the UE by using the respective transmission beams. After receiving the signals transmitted by the base station through the respective transmission beams, the UE may perform a channel measurement on the respective transmission beams to determine channel quality corresponding to the respective transmission beams. Then, the transmission beams of the base station are grouped according to the channel measurement results of the UE on different transmission beams and states of the reception beams included in the UE. Specifically, the UE may select one or more reception beams in the range of each receiving set according to its different receiving sets and channel condition, and use the transmission beams corresponding to the one or more reception beams as a transmission beam group, and feed back information on the transmission beam group(s) to the base station.

Alternatively, the transmission beam group information fed back by the UE to the base station may include all pieces of the transmission beam group information, or a part of all pieces of the transmission beam group information may be reported; the transmission beam group information reported by the UE may include information on all the transmission beams in each transmission beam group, and may also include information on a part of transmission beams in all the transmission beams of one or more transmission beam groups. Alternatively, the transmission beam group information may include various information such as beam indices of the transmission beams, beam grouping states (for example, group numbers). For example, when the UE includes two transceiver panels in total, it may be considered that the UE has two receiving sets, and each receiving set includes two TXRUs. Therefore, the UE may divide all the transmission beams of the base station corresponding to the two reception beams preferred by the two TXRUs on each receiving set into one group, so that the UE may report two groups of transmission beam group information to the base station in total, or may report one piece of the transmission beam group information to the base station. For example, the UE may select and report one piece of the transmission beam group information according to the channel condition. In one or more transmission beam groups, the UE may select a part of the transmission beams for reporting according to the channel measurement results. For example, the UE may select one group of transmission beams whose channel measurement results exceed a threshold to report to the base station. Furthermore, when the UE needs to feed back channel measurement results for different transmission beams to the base station, the method in the embodiment of the present disclosure may further include: the base station receiving the channel measurement results reported by the UE and corresponding to at least part of the transmission beams. Alternatively, the channel measurement results may include Reference Signal Receiving Powers (RSRPs), and/or Channel State Information (CSI) of L1 layer that is supported by the respective transmission beams, and the like.

Alternatively, the beam indices in the transmission beam group information reported by the UE may be determined according to the channel measurement results for the transmission beams. For example, the UE may first determine a reference transmission beam in one certain transmission beam group. For example, the UE may determine a reference transmission beam in one certain transmission beam group according to the channel measurement results (for example, RSRPs) of all transmission beams in the transmission beam group. Here, a beam with the best channel measurement result may be considered as the reference transmission beam. Of course, other preset standards may also be used to determine the reference transmission beam. Subsequently, at least part of transmission beams in the transmission beam group may be selected, and the beam indices of the at least part of transmission beams may be acquired, according to a spatial position relationship between other transmission beams in the transmission beam group and the reference transmission beam, and/or a relative position relationship between a reference signal resource mapping position for other transmission beams and a reference signal resource mapping position for the reference transmission beam. For example, when a RSRP measurement result of the reference transmission beam is the best, it may be considered that RSRP results of beams in proximity to the spatial position of the reference transmission beam are also good, and hence these beams may be selected as preferred transmission beams in the transmission beam group to be fed back to the base station. The spatial position proximity here may be considered that angles between the spatial azimuths of these preferred transmission beams and the reference transmission beam are small, for example, the angles may be less than a certain threshold. On this basis, considering that the base station generally configures beams close in spatial position on adjacent reference signal resource mapping positions during configuration. Therefore, in this case, other transmission beams in proximity to a position of reference signal resources of the reference beam may also be used as the preferred transmission beams for feedback. FIG. 4 shows a schematic diagram of selecting transmission beams for feedback by using positions of reference signal resource in one embodiment of the present disclosure. As shown in FIG. 4, different transmission beams are mapped to the respective resource mapping positions of a reference signal resource pool, i.e., the corresponding resources are allocated to different transmission beams, which are numbered as 1-16, respectively. In the base station configuration of the embodiment shown in FIG. 4, transmission beams corresponding to adjacent resource mapping positions are adjacent in spatial position, i.e., a beam 2 and a beam 3 are adjacent in spatial position, and a beam 6 and a beam 10 are also adjacent in spatial position. For the above transmission beams 1-16, the UE acquires that the transmission beam of the base station with the highest RSRP is a beam 7 through RSRP measurement. Therefore, the UE may define the beam 7 as the reference transmission beam and consider that RSRPs of beams 3, 6, 8, and 11 that are adjacent in spatial position are relatively high, and report the beams 7, 3, 6, 8, and 11 to the base station. In this case, the UE may report absolute numbers of the respective selected beams, such as 7, 3, 6, 8, 11. Alternatively, in order to save reporting overhead, the UE may also report relative values between indices of the respective beams and an index of the reference transmission beam, which is more meaningful for beam numbers with a large number of bits. For example, in an example where the reference transmission beam is 7, the UE may report that the foregoing beams are beams 7, −4, −1, 1, 4, and 4 in order to reduce the number of bits for reporting the transmission beam information. −4, −1, 1, and 4 are relative values of the indices of other beams relative to the reference beam, and the base station may determine the other beams through 7−4, 7−1, 7+1, and 7+4. In this case, the UE may set one bit in the report information to indicate the sign. For example, a value of 1 may be used to represent "+", and a value of 0 may be used to represent "−". Of course, the value of 0 may also be used to represent "+", and the value of 1 may also be used to represent "−". Moreover, remaining bits may be used to report absolute values of differences between the beam indices of the other transmission beams and the beam index of the reference transmission beam. For example, "4" in the foregoing beam relative number "−4" in FIG. 4 may be represented as "100". In this way, a relative number of a certain transmission beam and the reference transmission beam may be reported by a combination of a bit representing the sign and bits representing the absolute value of the difference between the beam indices, in order to reduce system overhead as much as possible. Of course, alternatively, the transmission beams for feedback may also be selected by comprehensively considering the spatial position relationship and a relative position relationship of the reference signal resource mapping positions between the other transmission beams and the reference transmission beam. After the UE determines the reference transmission beam and obtains the beam indices of the transmission beams that need to be reported accordingly, the UE needs to inform the base station of the reference transmission beam so that the base station can accurately acquire information on all the transmission beams fed back by the UE according to the reference transmission beam and the relative number from the reference transmission beam. For example, the UE may notify the base station of the reference transmission beam in an explicit manner, and alternatively, the UE may set one bit for each reported beam and use the bit to notify the base station whether the beam is the reference transmission beam. For example, a bit value of 1 may be used to represent that the beam is the reference transmission beam, and a bit value of 0 may be used to represent that the beam is not the reference transmission beam. Of course, the reverse is also possible. As another example, the UE may also notify the reference transmission beam in an implicit manner. For example, the UE and the base station may agree on that the first beam in a series of beams reported by the UE is the default reference transmission beam, and the other beams are the relative numbers relative to the reference transmission beam. The above description is only an example, and in practical applications, the reference transmission beam may be determined and the relative number to the reference transmission beam may be represented in any manner.

Alternatively, the information on receiving capability of the receiving set of the UE may be transmitted as one-time or long-period information. For example, when the information on receiving capability of each receiving set is the same, the information on receiving capability may be combined and reported only once, without reporting with each piece of different transmission beam group information, so as to maximize the system overhead savings. For another example, when the information on receiving capability of one or more receiving sets is different, it is needed to report different transmission beam groups and the information on receiving capability of the corresponding receiving sets.

The selecting unit 820 selects transmission beams corresponding to each receiving set and used for transmitting information to the user equipment based at least in part on the transmission beam group information and the information on receiving capability of the receiving set.

After acquiring information fed back by the UE, for example, including beam indices of the at least part of transmission beams in the transmission beam group, the selecting unit 820 may select the transmission beams according to the transmission beam group information, the information on receiving capability of each receiving set and beam information on the at least part of the transmission beams in each transmission beam group. Considering that the UE does not expect the base station to transmit a signal to it for a certain receiving set by using transmission beams whose number is greater than a number indicated by the information on receiving capability of the receiving set, therefore, in the transmission beam group, the number of transmission beams selected by the selecting unit 820 and corresponding to one certain receiving set may be less than or equal to the number of reception beams that may be simultaneously formed in the receiving set. In other words, when a certain receiving set of the UE can only contain two TXRUs and therefore can only simultaneously form two reception beams, the UE may expect the base station to transmit information for this receiving set by using transmission beams whose number is less than or equal to 2. Only in this case can the UE be able to receive information on all the transmission beams transmitted by the base station. Alternatively, the base station may select according to the transmission beams included in the transmission beam group information fed back by the UE. For example, the base station may select transmission beams with higher RSRPs to transmit information according to the RSRP result reported by the UE. Alternatively, the base station may also select transmission beams that are not included in the transmission beam group fed back by the UE. For example, the base station may select transmission beams, which have a relatively close spatial position relationship and/or a relative position relationship of reference signal resource mapping positions with transmission beams which have higher RSRPs reported by the UE, to transmit information.

The selecting unit 820 may transmit beam indications to the UE after determining the selected transmission beams, to indicate to the UE related information on the transmission beams selected by the base station. Alternatively, when the number of transmission beams in the transmission beam group selected by the UE according to the information on receiving capability of its corresponding receiving set is different, the base station may also determine whether to transmit beam indication information accordingly, and may select different beam indication information to transmit when transmitting. For example, when the number of the at least part of transmission beams in the transmission beam group reported by the UE is less than or equal to the number of reception beams that can be simultaneously formed in the receiving set corresponding to the transmission beam group (i.e., the information on receiving capability of the receiving set), the selecting unit 820 can only select the transmission beams from the corresponding transmission beam group reported by the UE. Therefore, in this case, the number of transmission beams selected by the selecting unit 820 will not be greater than the information on receiving capability of the receiving set of the UE, and the UE can also ensure that it has the ability to receive the information transmitted by the base station through the corresponding transmission beams on the corresponding receiving set. Accordingly, the selecting unit 820 may not need to indicate to the UE the specific information on the transmission beams that it finally selects, and may only indicate information on the transmission beam group corresponding to the transmission beams that it selects. Alternatively, the UE may also make the number of the at least part of transmission beams in the reported transmission beam group greater than the number of reception beams that can be simultaneously formed in the receiving set corresponding to the transmission beam group. In this case, when the selecting unit 820 selects from these transmission beams, it may be necessary to inform the UE of information on the transmission beams that it selects and/or information on the transmission beam group to which the transmission beams belong, so that the UE can cooperate with the base station as much as possible to receive. Of course, the beam indications from the base station to the UE in the above different cases may be selected according to practical conditions.

For example, in one example, when the selecting unit 820 has selected transmission beams 1 and 3 in a transmission beam group (1) and transmission beam 4 in a transmission beam group (2), the base station may only inform the UE of the transmission beam groups (1) and (2) without informing the UE of beams 1, 3, and 4. Therefore, the base station may inform the UE of information on the transmission beam groups instead of information on specific transmission beams, so as to save system overhead.

In another example, when the information on receiving capability of a certain receiving set of the UE is 2, but the number of transmission beams in the reported transmission beam group corresponding to the receiving set is 4 (for example, beams 5, 6, 7, 8), the base station may need to select 2 of the 4 transmission beams to transmit information to ensure that it is within the corresponding receiving capability of the receiving set of the UE. For example, the base station may select transmission beams 5 and 7. In this case, the base station needs to inform the UE of information on the selected transmission beams. As described above, the base station may choose to inform the UE of information on all the transmission beams, i.e., the base station informs the UE that the transmission beams selected by the base station are the beam 5 and the beam 7, respectively, and the system overhead for this method is large. Alternatively, the base station may also combine the four beams reported by the UE according to the information on receiving capability of this receiving set of the UE, and each combination may include beams whose number is equal to or less than the number of pieces of information on receiving capability of the corresponding receiving set. For example, in this example, the number of pieces of information on receiving capability of this receiving set is 2. Therefore, it may be set that a combination 1 includes beams 5 and 6 (two beams), a combination 2 includes beams 7 and 8, a combination 3 includes beams 5 and 7, and a combination 4 includes beams 6 and 8. The combination relationship described above may be stored in advance by both the base station and the UE, or may be notified to the UE by the base station in advance through signaling. After that, when the base station selects the beams 5 and 7, it is only necessary to inform the UE that the currently selected combination is the combination 3. With this combined beam indication transmitting method, the system overhead may be further saved.

Alternatively, when the base station transmits to the UE information indicating the transmission beam group to which the transmission beams belong only according to the selected transmission beams, since the UE cannot accurately acquire a specific state of the transmission beams selected by the base station, information may be received by polling on different time slots and/or resource units. For example, the base station and the UE may agree on a manner of transmitting and receiving information in advance through, for example, signaling. The signaling may be MAC CE signaling, or may be RRC signaling, or a DCI indication. Specifically, the base station may transmit information with different transmission beams on different time slots and/or resource unit positions, while the UE may receive information with different reception beams corresponding to the transmission beam group sequentially on different time slots and/or resource units according to the agreement, after receiving the corresponding transmission beam group information indicated by the base station. Further, the UE may also perform channel measurement according to the information receiving status, and can acquire which case has a better channel quality on different time slots and/or resource units, and feed back the measurement results to the base station, so that the base station selects the transmission beams for transmitting information according to the channel measurement results of the UE as much as possible.

FIG. 5 shows a state of information transmission between the base station and the UE according to one example of the present disclosure. As shown in FIG. 5, a transmission beam group (3) composed of transmission beams 1 and 2 of the base station corresponds to a receiving set 1 of the UE. The receiving set 1 may generate two reception beams 1 and 2 at the same time to receive the information transmitted by corresponding transmission beams of the base station. When the base station expects to use the transmission beams in the transmission beam group (3) to transmit information, it only informs the UE of the transmission beam group information, and does not accurately inform the UE which transmission beam of the transmission beams 1 and 2 will be used for transmitting. In this case, the base station and the UE will agree on: in time slot 1, the base station transmits information through the transmission beam 1, and the UE receives through the reception beam 1; in time slot 2, the base station transmits information through the transmission beam 2, and the UE receives through the reception beam 2; and in time slot 3, the base station transmits information through the transmission beams 1 and 2 together, and the UE receives through the reception beams 1 and 2 together. In this way, no matter the base station selects which transmission beam or transmission beams to transmit, the UE can select corresponding reception beams at a corresponding time point to accurately receive information. Of course, the base station may also transmit information through the transmission beam 1 only in the time slot 1, and the UE will accordingly receive the information through the reception beam 1 only in the time slot 1. Further, the UE may also perform a channel measurement according to the information receiving status, and can acquire which case has the best channel quality in the 3 time slots (for example, the timeslot 1), and feed back the measurement results to the base station, so that the base station selects the transmission beam 1 in for transmitting information in the time slot 1 according to the channel measurement results of the UE as much as possible.

Alternatively, the base station may also transmit information with the same transmission beams on different timeslots and/or resource unit positions within an agreed time period, and the UE may receive information with different reception beams corresponding to the transmission beam group sequentially on different time slots and/or resource units according to the agreement, after receiving the corresponding transmission beam group information indicated by the base station. Further, the UE may also perform channel measurement according to the information receiving status, and can acquire which case has a better channel quality on different time slots and/or resource units, and select the corresponding reception beams to receive information according to the channel measurement results as much as possible.

FIG. 6 shows a state of information transmission between the base station and the UE according to another example of the present disclosure. Similar to FIG. 5, the transmission beam group (3) composed of the transmission beams 1 and 2 of the base station corresponds to the receiving set 1 of the UE. The receiving set 1 may generate two reception beams 1 and 2 at the same time to receive the information transmitted by the corresponding transmission beams of the base station. When the base station expects to use the transmission beams in the transmission beam group (3) to transmit information, it only informs the UE of the transmission beam group information, and does not accurately inform the UE which transmission beam of the transmission beams 1 and 2 will be used for transmitting. The difference from FIG. 5 is that the base station will only transmit information in one of the manners. For example, the base station may only transmit information through the transmission beams 1 and 2 together within a preset period of time, while the UE will use different reception beams to receive information, respectively, in this corresponding period of time. For example, in the time slot 1, the UE receives through the reception beam 1; in time slot 2, the UE receives through the reception beam 2; and in time slot 3, the UE receives through the reception beams 1 and 2 together. In this case, no matter the base station uses which manner to transmit, the UE will use different reception beams to receive information in turn, thereby ensuring that the UE can always receive information with a good quality in a certain period. Alternatively, the UE may also perform a channel measurement according to the information receiving status during this process, and can acquire which case has the best channel quality in the 3 time slots (for example, the timeslot 3), and use the reception beams 1 and 2 with the best channel quality together to receive information transmitted by the base station.

The base station provided according to the embodiments of the present disclosure can enable the user equipment can enable the user equipment to report the information on receiving capability of the receiving set corresponding to each transmission beam group of the base station, so that the base station can select the corresponding transmit beams based at least in part on the information on receiving capability of the user equipment. This beam selection method can significantly reduce the system overhead and improve the information transmission efficiency of the system.

Hereinafter, a user equipment according to the embodiments of the present invention is described with reference to FIG. 9. The user equipment may perform the beam selection method described above. Since operations of the user equipment are substantially the same as each step of the beam selection method described in FIG. 7, only a brief description is given here, and repeated description of the same content is omitted.

Figure 9:
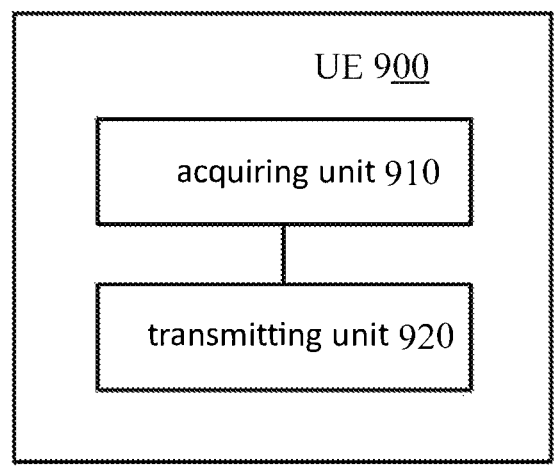
FIG. 9 is a structural block diagram of a user equipment according to one embodiment of the present disclosure.

As shown in FIG. 9, a UE 900 may include an acquiring unit 910 and a transmitting unit 920. It should be recognized that FIG. 9 only shows components related to embodiments of the present invention, and other components are omitted, but this is only schematic and the UE 900 may include other components as needed.

The acquiring unit 910 acquires transmission beam group information on a base station and information on receiving capability of a receiving set of the user equipment corresponding to each transmission beam group, where the information on receiving capability of the receiving set is the number of reception beams that the user equipment can simultaneously form in the receiving set.

The receiving set of the UE may be a transceiver panel in the UE, i.e., a panel, and the transceiver panel may respectively carry one or more TXRUs to transmit and receive information. In the embodiments of the present disclosure, the number of TXRUs carried on one receiving set of the UE may be used as the information on receiving capability of the receiving set of the UE, i.e., the number of reception beams that the UE can simultaneously form in the receiving set is used as the information on receiving capability of the receiving set. For example, if two TXRUs are carried on one transceiver panel of the UE, it means that two reception beams can be formed simultaneously in the receiving set formed by the transceiver panel of the UE, to receive information transmitted by the two corresponding transmission beams of the base station. Of course, the receiving set of the UE may also have other representations. For example, a specific part of one or more transceiver panels of the UE may be used as one receiving set of the UE. For another example, a combination of any part of the reception beams of the UE may be formed into one receiving set of the UE, and the number of reception beams that the UE can simultaneously form in this receiving set is the information on receiving capability of this receiving set. The above example of the receiving set does not constitute a specific limitation on the receiving set of the UE. In practical application scenarios, an arbitrary division manner may be selected to divide the receiving set of the UE.

After the base station transmits signals to the UE with respective transmission beams, the acquiring unit 910 of the UE may receive the signals transmitted by the base station and perform a channel measurement on the respective transmission beams to determine channel quality corresponding to the respective transmission beams. Then, the acquiring unit 910 groups the transmission beams of the base station according to the channel measurement results of the UE on different transmission beams and the states of the reception beams included in the UE. Specifically, the acquiring unit 910 may select one or more reception beams in the range of each receiving set according to its different receiving sets and channel condition, and use the transmission beams corresponding to the one or more reception beams as a transmission beam group.

Alternatively, the transmission beam group information acquired by the UE may include various information such as beam indices of the transmission beams, beam grouping states (for example, group numbers). The transmission beam group information acquired by the UE may include information on all the transmission beams in each transmission beam group, and may also include information on a part of all the transmission beams of one or more transmission beam groups. Alternatively, the transmission beam group information may include various information such as beam indices of the transmission beams, beam grouping states (for example, group numbers). For example, when the UE includes two transceiver panels in total, it may be considered that the UE has two receiving sets, and each receiving set includes two TXRUs. Therefore, the acquiring unit 910 may divide all the transmit beams of base stations corresponding to the two receive beams preferred by the two TXRUs on each receiving set into one group, and obtain two groups of transmission beam group information in total, or may report one piece of the transmission beam group information to the base station. For example, the UE may select and report one piece of the transmission beam group information according to the channel condition. The UE may select a part of the transmission beams in one or more transmission beam groups according to the channel measurement results. For example, the UE may select information on one group of transmission beams in a certain transmission beam group whose channel measurement results exceed a threshold as the transmission beam group information for the transmission beam group.

Alternatively, the beam indices in the transmission beam group information selected by the acquiring unit 910 may be determined according to the channel measurement results for the transmission beams. For example, the acquiring unit 910 may first determine a reference transmission beam in one certain transmission beam group. For example, the acquiring unit 910 may determine a reference transmission beam in one certain transmission beam group according to the channel measurement results (for example, RSRPs) of all transmission beams in the transmission beam group. Here, a beam with the best channel measurement result may be considered as the reference transmission beam. Of course, other preset standards may also be used to determine the reference transmission beam. Subsequently, at least part of transmission beams in the transmission beam group may be selected, and the beam indices of the at least part of transmission beams may be acquired, according to a spatial position relationship between other transmission beams in the transmission beam group and the reference transmission beam, and/or a relative position relationship between a reference signal resource mapping position for other transmission beams and a reference signal resource mapping position for the reference transmission beam. For example, when a RSRP measurement result of the reference transmission beam is the best, it may be considered that RSRP results of beams in proximity to the spatial position of the reference transmission beam are also good, and hence these beams may be selected as preferred transmission beams in the transmission beam group to be fed back to the base station. The spatial position proximity here may be considered that angles between the spatial azimuths of these preferred transmission beams and the reference transmission beam are small, for example, the angles may be less than a certain threshold. On this basis, considering that the base station generally configures beams close in spatial position on adjacent reference signal resource mapping positions during configuration. Therefore, in this case, other transmission beams in proximity to a position of reference signal resources of the reference beam may also be used as the preferred transmission beams for feedback. FIG. 4 shows a schematic diagram of selecting transmission beams for feedback by using positions of reference signal resources in one embodiment of the present disclosure. As shown in FIG. 4, different transmission beams are mapped to the respective resource mapping positions of a reference signal resource pool, i.e., the corresponding resources are allocated to different transmission beams, which are numbered as 1-16, respectively. In the base station configuration of the embodiment shown in FIG. 4, transmission beams corresponding to adjacent resource mapping positions are adjacent in spatial position, i.e., a beam 2 and a beam 3 are adjacent in spatial position, and a beam 6 and a beam 10 are also adjacent in spatial position. For the above transmission beams 1-16, the UE acquires that the transmission beam of the base station with the highest RSRP is a beam 7 through RSRP measurement. Therefore, the UE may define the beam 7 as the reference transmission beam and consider that RSRPs of beams 3, 6, 8, and 11 that are adjacent in spatial position are relatively high, and report the beams 7, 3, 6, 8, and 11 to the base station. In this case, the UE may report absolute numbers of the respective selected beams, such as 7, 3, 6, 8, 11. Alternatively, in order to save reporting overhead, the UE may also report relative values between indices of the respective beams and an index of the reference transmission beam, which is more meaningful for beam numbers with a large number of bits. For example, in an example where the reference transmission beam is 7, the UE may report that the foregoing beams are beams 7, −4, −1, 1, 4, and 4 in order to reduce the number of bits for reporting the transmission beam information. −4, −1, 1, and 4 are relative values of the indices of other beams relative to the reference beam, and the base station may determine the other beams through 7−4, 7−1, 7+1, and 7+4. In this case, the UE may set one bit in the report information to indicate the sign. For example, a value of 1 may be used to represent "+", and a value of 0 may be used to represent "−". Of course, the value of 0 may also be used to represent "+", and the value of 1 may also be used to represent "−". Moreover, remaining bits may be used to report absolute values of differences between the beam indices of the other transmission beams and the beam index of the reference transmission beam. For example, "4" in the foregoing beam relative number "−4" in FIG. 4 may be represented as "100". In this way, a relative number of a certain transmission beam and the reference transmission beam may be reported by a combination of a bit representing the sign and bits representing the absolute value of the difference between the beam indices, in order to reduce system overhead as much as possible. Of course, alternatively, the transmission beams for feedback may also be selected by comprehensively considering the spatial position relationship and a relative position relationship of the reference signal resource mapping positions between the other transmission beams and the reference transmission beam. The above description is only an example, and in practical applications, the reference transmission beam may be determined and the relative number to the reference transmission beam may be represented in any manner.

The transmitting unit 920 transmits the transmission beam group information and the information on receiving capability, so that the base station selects the transmission beams corresponding to each receiving set and used for transmitting information to the user equipment based at least in part on the transmission beam group information and the information on receiving capability of the receiving set.

Alternatively, the transmitting unit 920 may report all pieces of the transmission beam group information to the base station, or may report a part of all pieces of the transmission beam group information according to, for example, channel conditions, where the UE may report information on one or more transmission beam groups with better channel quality to the base station.

Alternatively, when the UE needs to feed back channel measurement results for different transmission beams to the base station, the method in the embodiments of the present disclosure may further include channel measurement results reported by the transmitting unit 920 and corresponding to the at least part of transmission beams. Alternatively, the channel measurement results may include Reference Signal Receiving Powers (RSRPs), and/or Channel State Information (CSI) of L1 layer that is supported by the respective transmission beams, and the like.

In addition, in the example of selecting the reference transmission beam and feeding back the beam indices as shown in FIG. 4, after the UE determines the reference transmission beam and obtains the beam indices of the transmission beams that need to be reported accordingly, the transmitting unit 920 further needs to inform the base station that which transmission beam is the reference transmission beam so that the base station can accurately acquire information on all the transmission beams fed back by the UE according to the reference transmission beam and the relative number from the reference transmission beam. For example, the transmitting unit 920 may notify the base station of the reference transmission beam in an explicit manner, and alternatively, the transmitting unit 920 may set one bit for each reported beam and use the bit to notify the base station whether the beam is the reference transmission beam. For example, a bit value of 1 may be used to represent that the beam is the reference transmission beam, and a bit value of 0 may be used to represent that the beam is not the reference transmission beam. Of course, the reverse is also possible. As another example, the transmitting unit 920 may also notify the reference transmission beam in an implicit manner. For example, the UE and the base station may agree on that the first beam in a series of beams reported by the transmitting unit 920 is the default reference transmission beam, and the other beams are the relative numbers relative to the reference transmission beam.

Alternatively, the information on receiving capability of the receiving set of the UE may be transmitted as one-time or long-period information. For example, when the information on receiving capability of each receiving set is the same, the transmitting unit 920 may combine and report the information on receiving capability only once, without reporting with each piece of different transmission beam group information, so as to maximize the system overhead savings. For another example, when the information on receiving capability of one or more receiving sets is different, it is needed to report different transmission beam groups and the information on receiving capability of the corresponding receiving sets.

Alternatively, after acquiring information fed back by the UE, for example, including beam indices of the at least part of transmission beams in the transmission beam group, the base station may further select the transmission beams according to the transmission beam group information, the information on receiving capability of each receiving set and beam information on the at least part of the transmission beams in each transmission beam group. Considering that the UE does not expect the base station to transmit a signal to it for a certain receiving set by using transmission beams whose number is greater than a number indicated by the information on receiving capability of the receiving set, therefore, in the transmission beam group, the number of transmission beams selected by the base station and corresponding to one certain receiving set may be less than or equal to the number of reception beams that may be simultaneously formed in the receiving set. In other words, when a certain receiving set of the UE can only contain two TXRUs and therefore can only simultaneously form two reception beams, the UE may expect the base station to transmit information for this receiving set by using transmission beams whose number is less than or equal to 2. Only in this case can the UE be able to receive information on all the transmission beams transmitted by the base station. Alternatively, the base station may select according to the transmission beams included in the transmission beam group information fed back by the UE. For example, the base station may select transmission beams with higher RSRPs to transmit information according to the RSRP result reported by the UE. Alternatively, the base station may also select transmission beams that are not included in the transmission beam group fed back by the UE. For example, the base station may select transmission beams, which have a relatively close spatial position relationship and/or a relative position relationship of reference signal resource mapping positions with transmission beams which have higher RSRPs reported by the UE, to transmit information.

The UE may acquire related information on the transmission beams selected by the base station according to beam indications transmitted by the base station. Alternatively, when the number of transmission beams in the transmission beam group selected by the UE according to the information on receiving capability of its corresponding receiving set is different, the base station may also determine whether to transmit beam indication information accordingly, and may select different beam indication information to transmit when transmitting. For example, when the number of the at least part of transmission beams in the transmission beam group reported by the transmitting unit 920 is less than or equal to the number of reception beams that can be simultaneously formed in the receiving set corresponding to the transmission beam group (i.e., the information on receiving capability of the receiving set), the base station can only select the transmission beams from the corresponding transmission beam group reported by the UE. Therefore, in this case, the number of transmission beams selected by the base station will not be greater than the information on receiving capability of the receiving set of the UE, and the UE can also ensure that it has the ability to receive the information transmitted by the base station through the corresponding transmission beams on the corresponding receiving set. Accordingly, the base station may not need to indicate to the UE the specific information on the transmission beams that it finally selects, and may only indicate information on the transmission beam group corresponding to the transmission beams that it selects. Alternatively, the UE may also make the number of the at least part of transmission beams in the reported transmission beam group greater than the number of reception beams that can be simultaneously formed in the receiving set corresponding to the transmission beam group. In this case, when the base station selects from these transmission beams, it may be necessary to inform the UE of information on the transmission beams that it selects and/or information on the transmission beam group to which the transmission beams belong, so that the UE can cooperate with the base station as much as possible to receive. Of course, the beam indications from the base station to the UE in the above different cases may be selected according to practical conditions.

For example, in one example, when the base station has selected transmission beams 1 and 3 in a transmission beam group (1) and transmission beam 4 in a transmission beam group (2), the base station may only inform the UE of the transmission beam groups (1) and (2) without informing the UE of beams 1, 3, and 4. Therefore, the base station may inform the UE of information on the transmission beam groups instead of information on specific transmission beams, so as to save system overhead.

In another example, when the information on receiving capability of a certain receiving set of the UE is 2, but the number of transmission beams in the reported transmission beam group corresponding to the receiving set is 4 (for example, beams 5, 6, 7, 8), the base station may need to select 2 of the 4 transmission beams to transmit information to ensure that it is within the corresponding receiving capability of the receiving set of the UE. For example, the base station may select transmission beams 5 and 7. In this case, the base station needs to inform the UE of information on the selected transmission beams. As described above, the base station may choose to inform the UE of information on all the transmission beams, i.e., the base station informs the UE that the transmission beams selected by the base station are the beam 5 and the beam 7, respectively, and the system overhead for this method is large. Alternatively, the base station may also combine the four beams reported by the UE according to the information on receiving capability of this receiving set of the UE, and each combination may include beams whose number is equal to or less than the number of pieces of information on receiving capability of the corresponding receiving set. For example, in this example, the number of pieces of information on receiving capability of this receiving set is 2. Therefore, it may be set that a combination 1 includes beams 5 and 6 (two beams), a combination 2 includes beams 7 and 8, a combination 3 includes beams 5 and 7, and a combination 4 includes beams 6 and 8. The combination relationship described above may be stored in advance by both the base station and the UE, or may be notified to the UE by the base station in advance through signaling. After that, when the base station selects the beams 5 and 7, it is only necessary to inform the UE that the currently selected combination is the combination 3. With this combined beam indication transmitting method, the system overhead may be further saved.

Alternatively, when the base station transmits to the UE information indicating the transmission beam group to which the transmission beams belong only according to the selected transmission beams, since the UE cannot accurately acquire a specific state of the transmission beams selected by the base station, information may be received by polling on different time slots and/or resource units. For example, the base station and the UE may agree on a manner of transmitting and receiving information in advance through, for example, signaling. The signaling may be MAC CE signaling, or may be RRC signaling, or a DCI indication. Specifically, the base station may transmit information with different transmission beams on different time slots and/or resource unit positions, while the UE may receive information with different reception beams corresponding to the transmission beam group sequentially on different time slots and/or resource units according to the agreement, after receiving the corresponding transmission beam group information indicated by the base station. Further, the UE may also perform channel measurement according to the information receiving status, and can acquire which case has a better channel quality on different time slots and/or resource units, and feed back the measurement results to the base station, so that the base station selects the transmission beams for transmitting information according to the channel measurement results of the UE as much as possible.

FIG. 5 shows a state of information transmission between the base station and the UE according to one example of the present disclosure. As shown in FIG. 5, a transmission beam group (3) composed of transmission beams 1 and 2 of the base station corresponds to a receiving set 1 of the UE. The receiving set 1 may generate two reception beams 1 and 2 at the same time to receive the information transmitted by corresponding transmission beams of the base station. When the base station expects to use the transmission beams in the transmission beam group (3) to transmit information, it only informs the UE of the transmission beam group information, and does not accurately inform the UE which transmission beam of the transmission beams 1 and 2 will be used for transmitting. maximize, the base station and the UE will agree on: in time slot 1, the base station transmits information through a transmission beam 1, and the UE receives through the reception beam 1; in time slot 2, the base station transmits information through the transmission beam 2, and the UE receives through the reception beam 2; and in time slot 3, the base station transmits information through the transmission beams 1 and 2 together, and the UE receives through reception beams 1 and 2 together. In this way, no matter the base station selects which transmission beam or transmission beams to transmit, the UE can select corresponding reception beams at a corresponding time point to accurately receive information. Of course, the base station may also transmit information through the transmission beam 1 only in the time slot 1, and the UE will accordingly receive the information through the reception beam 1 only in the time slot 1. Further, the UE may also perform a channel measurement according to the information receiving status, and can acquire which case has the best channel quality in the 3 time slots (for example, the timeslot 1), and feed back the measurement results to the base station, so that the base station selects the transmission beam 1 for transmitting information in the time slot 1 according to the channel measurement results of the UE as much as possible.

Alternatively, the base station may also transmit information with the same transmission beams on different timeslots and/or resource unit positions within an agreed time period, and the UE may receive information with different reception beams corresponding to the transmission beam group sequentially on different time slots and/or resource units according to the agreement, after receiving the corresponding transmission beam group information indicated by the base station. Further, the UE may also perform channel measurement according to the information receiving status, and can acquire which case has a better channel quality on different time slots and/or resource units, and select the corresponding reception beams to receive information according to the channel measurement results as much as possible.

FIG. 6 shows a state of information transmission between the base station and the UE according to another example of the present disclosure. Similar to FIG. 5, the transmission beam group (3) composed of the transmission beams 1 and 2 of the base station corresponds to the receiving set 1 of the UE. The receiving set 1 may generate two reception beams 1 and 2 at the same time to receive the information transmitted by the corresponding transmission beams of the base station. When the base station expects to use the transmission beams in the transmission beam group (3) to transmit information, it only informs the UE of the transmission beam group information, and does not accurately inform the UE which transmission beam of the transmission beams 1 and 2 will be used for transmitting. The difference from FIG. 5 is that the base station will only transmit information in one of the manners. For example, the base station may only transmit information through the transmission beams 1 and 2 together within a preset period of time, while the UE will use different reception beams to receive information, respectively, in this corresponding period of time. For example, in the time slot 1, the UE receives through the reception beam 1; in time slot 2, the UE receives through the reception beam 2; and in time slot 3, the UE receives through the reception beams 1 and 2 together. In this case, no matter the base station uses which manner to transmit, the UE will use different reception beams to receive information in turn, thereby ensuring that the UE can always receive information with a good quality in a certain period. Alternatively, the UE may also perform a channel measurement according to the information receiving status during this process, and can acquire which case has the best channel quality in the 3 time slots (for example, the timeslot 3), and use the reception beams 1 and 2 with the best channel quality together to receive information transmitted by the base station.

The user equipment provided according to the embodiments of the present disclosure can enable the user equipment to report the information on receiving capability of the receiving set corresponding to each transmission beam group of the base station, so that the base station can select the corresponding transmit beams based at least in part on the information on receiving capability of the user equipment. This beam selection method can significantly reduce the system overhead and improve the information transmission efficiency of the system.

The beam index in the embodiments of the present disclosure may be replaced by a resource mapping position of a reference signal, a resource mapping indication of a reference signal, a slot indication of a reference signal, and a resource mapping indication, or the like.

It should be noted that block diagrams used for the illustration of the above embodiments represent blocks in functions. These functional blocks (structural units) may be realized by any combination of hardware and/or software. In addition, the means for implementing respective functional blocks is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 10:
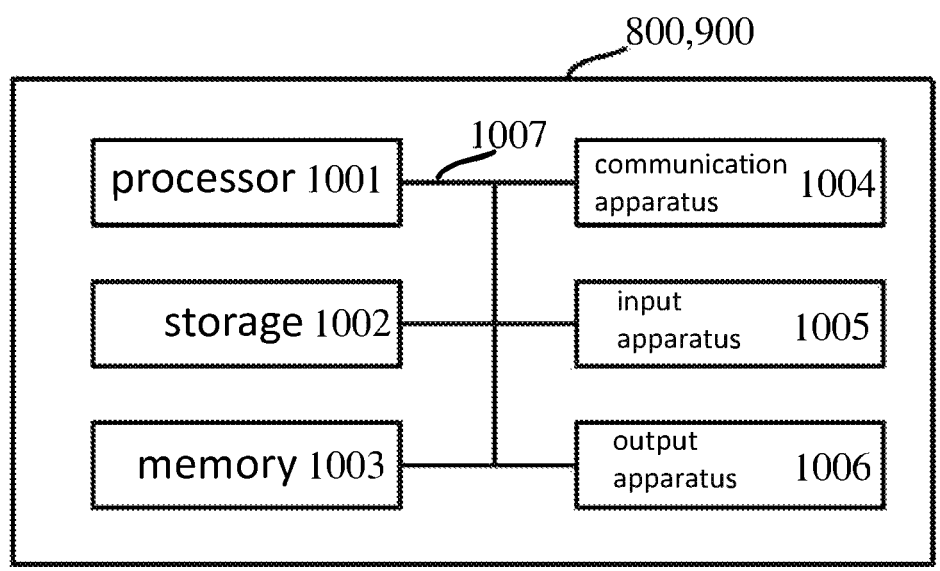
FIG. 10 is an example diagram of a hardware structure of a base station or a user equipment according to one embodiment of the present disclosure.

For example, the (radio) base station, user terminal, and the like in the embodiment of the present invention can function as a computer that executes processing of the wireless communication method of the present invention. FIG. 10 is a diagram illustrating an example of a hardware configuration of a related base station and a related user terminal according to the embodiments of the present invention. The above described base station 800 and user terminal 900 may be physically designed as a computer apparatus including a processor 1001, a storage 1002, a memory 1003, a communication apparatus 1004, an input apparatus 1005, an output apparatus 1006, and a bus 1007 and the like.

It should be noted that, in the following description, the word "apparatus" may be replaced by "circuit", "device", "unit" and so on. It should be noted that the hardware structure of a base station 800 and a user terminal 900 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. It should be noted that the processor 1001 may be implemented with one or more chips.

Each function of the base station 800 and user terminal 900 is implemented by reading predetermined software (program) on hardware such as the processor 1001 and the memory 1002, so as to make the processor 1001 perform calculations, and by controlling the communication carried out by the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, control unit of user equipment 1000 may be implemented by a control program stored in the memory 1002 and operated by the processor 1001, and may also be implemented similarly for other function blocks.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register", a "cache", a "main memory" (primary storage apparatus) and so on. The memory 1002 can store executable programs (program codes), software modules and so on for implementing the wireless communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device", a "network controller", a "network card", a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD).

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). It should be noted that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the base station 800 and the user equipment 900 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be installed with at least one of these pieces of hardware.

In addition, it should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a carrier frequency, a cell, or the like.

In addition, the wireless frame may be composed of one or more periods (frames) in the time domain. Each of the one or more periods (frames) constituting the wireless frame may also be referred to as a subframe. Further, a subframe may be composed of one or more slots in the time domain. The subframe may be a fixed length of time duration (eg, 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include multiple microslots. Each microslot may be comprised of one or more symbols in the time domain. Furthermore, a microslot may also be referred as "a subframe".

A wireless frame, a subframe, a slot, a microslot and a symbol all represent the time unit when transmitting signals. A wireless frame, a subframe, a slot, a microslot and a symbol may also use other names that correspond to each other. For example, one subframe may be referred to as a "transmission time interval (TTI)", and a plurality of consecutive subframes may also be referred to as a "TTI", and one slot or one microslot may also be referred to as a "TTI." That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a microslot, or the like instead of a subframe.

Here, a TTI refers to the minimum time unit of scheduling in wireless communication, for example. For example, in LTE systems, a wireless base station schedules the wireless resources (such as the frequency bandwidth and transmission power that can be used in each user terminal) to allocate to each user terminal in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

It should be noted that, when one slot or one microslot is called a TTI, more than one TTI (i.e., more than one slot or more than one microslot) may also become the scheduled minimum time unit. Furthermore, the number of slots (the number of microslots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "microslot", or a "short microslot" and so on.

It should be noted that, a long TTI (eg, a normal TTI, a subframe, etc.) may be replaced with a TTI having a time duration exceeding 1 ms, and a short TTI (eg, a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one microslot, one subframe or one TTI duration. One TTI and one subframe each may be comprised of one or more resource blocks, respectively. It should be noted that one or more RBs may also be referred to as a "physical resource block (PRB (Physical RB))", a "Sub-Carrier Group (SCG)", a "Resource Element Group (REG)", a "PRG pair", an "RB pair" and so on.

Also, a resource block may also be composed of one or more resource elements (RE). For example, one RE can be a wireless resource area of a subcarrier and a symbol.

It should be noted that the above-described structures of wireless frames, subframes, slots, microslots and symbols and so on are simply examples. For example, configurations such as the number of subframes included in a wireless frame, the number of slots of each subframe or wireless frame, the number or microslots included in a slot, the number of symbols and RBs included in a slot or microslot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs (Control Elements)).

Also, reporting of predetermined information does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, the terms "base station (BS)", "radio base station", "eNB", "gNB", "cell", "sector", "cell group", "carrier" and "component carrier" may be used interchangeably. A base station may be referred to as a "fixed station", "NodeB", "eNodeB (eNB)", "access point", "transmission point", "receiving point", "femto cell", "small cell" and so on.

A base station can accommodate one or more (for example, three) cells (also referred to as "sectors"). When a base station accommodates a plurality of cells, the entire coverage area of the base station can be partitioned into a plurality of smaller areas, and each smaller area can provide communication services with base station subsystems (for example, indoor small base stations (RRHs (Remote Radio Heads))). The term "cell" or "sector" refers to part or all of the coverage area of a base station and/or a base station subsystem that provides communication services within this coverage.

In the present specification, the terms "mobile station (MS)", "user terminal", "user equipment (UE)" and "terminal" may be used interchangeably. The base station is sometimes referred to by terms such as a fixed station, a NodeB, a eNodeB (eNB), an access point, an transmitting point, a receiving point, a femto cell, and small cell, and the like.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the base station 800 may have the functions of the user terminal 900. In addition, terms such as "uplink" and "downlink" may be interpreted as "side." For example, an uplink channel may be interpreted as a side channel.

Likewise, the user terminals in this specification may be interpreted as radio base stations. In this case, the base stations 800 may have the functions of the user terminals 900 described above.

In the present specification, it is assumed that certain actions to be performed by base station may, in some cases, be performed by its higher node (upper node). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000 (Code Division Multiple Access), UMB (Ultra Mobile Broadband), IEEE 802.11 (Wi-Fi (registered trademark)), IEEE 802.16 (WiMAX (registered trademark)), IEEE 920.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A method performed by a terminal, comprising:
   acquiring transmission beam group information on a base station and information on receiving capability of a receiving set of the terminal corresponding to each transmission beam group, wherein the information on receiving capability of each receiving set is a number of reception beams that the terminal can simultaneously form in the receiving set;
   transmitting the transmission beam group information and the information on receiving capability of each receiving set to the base station,
   wherein the transmission beam group information includes beam information on at least part of transmission beams in the transmission beam group, and the method further comprising:
   determining a reference transmission beam in the transmission beam group according to channel measurement results of all transmission beams in the transmission beam group; and selecting at least part of transmission beams in the transmission beam group, and acquiring beam indices of the at least part of transmission beams, according to at least one of a spatial position relationship between other transmission beams in the transmission beam group and the reference transmission beam, and a relative position relationship between reference signal resource mapping positions for other transmission beams and a reference signal resource mapping position for the reference transmission beam.

2. A base station, comprising:
a processor;
a storage medium having computer program instructions stored thereon, wherein the computer program instructions, when executed by the processor, perform processing of:
receiving transmission beam group information on the base station and information on receiving capability of a receiving set of a terminal corresponding to each transmission beam group fed back by the terminal, wherein the information on receiving capability of each receiving set is a number of reception beams that the terminal can simultaneously form in the receiving set;
selecting transmission beams to be used for subsequently transmitting information to the terminal based at least in part on the transmission beam group information and the information on receiving capability of each receiving set,
wherein the transmission beam group information includes beam information on at least part of transmission beams in the transmission beam group, and the processor is further configured to:
receive a reference transmission beam in the transmission beam group notified by the terminal, wherein the reference transmission beam is determined by the terminal according to channel measurement results of all transmission beams in the transmission beam group, and
receive beam indices of the at least part of transmission beams in the transmission beam group notified by the terminal, wherein the at least part of transmission beams are selected and the beam indices of the at least part of transmission beams are acquired by the terminal according to at least one of a spatial position relationship between other transmission beams in the transmission beam group and the reference transmission beam, and a relative position relationship between reference signal resource mapping positions for other transmission beams and a reference signal resource mapping position for the reference transmission beam.

3. A terminal, comprising:
a processor;
a storage medium having computer program instructions stored thereon, wherein the computer program instructions, when executed by the processor, perform processing of:
acquiring transmission beam group information on a base station and information on receiving capability of a receiving set of the terminal corresponding to each transmission beam group, wherein the information on receiving capability of each receiving set is a number of reception beams that the terminal can simultaneously form in the receiving set;
transmitting the transmission beam group information and the information on receiving capability of each receiving set to the base station,
wherein the transmission beam group information includes beam information on at least part of transmission beams in the transmission beam group, and the processor is further configured to:
determine a reference transmission beam in the transmission beam group according to channel measurement results of all transmission beams in the transmission beam group; and
select at least part of transmission beams in the transmission beam group, and acquire beam indices of the at least part of transmission beams, according to at least one of a spatial position relationship between other transmission beams in the transmission beam group and the reference transmission beam, and a relative position relationship between reference signal resource mapping positions for other transmission beams and a reference signal resource mapping position for the reference transmission beam.

4. The terminal according to claim 3, wherein
the transmission beam group includes one group of transmission beams corresponding to reception beams selected in a range of the receiving set.

5. The terminal according to claim 3, wherein
a number of transmission beams selected by the base station in the transmission beam group corresponding to the receiving set is less than or equal to the number of reception beams that can be simultaneously formed in the receiving set.

6. The terminal according to claim 3, wherein
the at least part of transmission beams in the transmission beam group are transmission beams with a channel quality exceeding a preset value in the transmission beam group.

7. The terminal according to claim 3, wherein
the processor is further configured to transmit channel measurement results corresponding to the at least part of transmission beams to the base station.

8. The terminal according to claim 3, wherein
the reference transmission beam is explicitly or implicitly notified to the base station.

9. The terminal according to claim 3, wherein
the processor is further configured to receive information that indicates a transmission beam group to which the transmission beams belong and is transmitted by the base station according to the selected transmission beams.

10. The terminal according to claim 9, wherein
the processor is further configured to receive information on at least one of different time slots and different resource units with one or more reception beams corresponding to the transmission beam group sequentially according to a preset rule.

11. The terminal according to claim 9, wherein
the processor is further configured to receive information with one or more reception beams corresponding to the transmission beam group within a preset time or period.

12. The base station according to claim 2, wherein
the transmission beam group includes one group of transmission beams corresponding to reception beams selected in a range of the receiving set.

13. The base station according to claim 2, wherein
a number of selected transmission beams in the transmission beam group corresponding to the receiving set is less than or equal to the number of reception beams that can be simultaneously formed in the receiving set.

14. The base station according to claim 2, wherein
the transmission beam group information includes information on at least part of transmission beams in the transmission beam group.

15. The base station according to claim 14, wherein the at least part of transmission beams in the transmission beam group are transmission beams with a channel quality exceeding a preset value in the transmission beam group.

16. The base station according to claim 14, wherein the processor is further configured to receive channel measurement results corresponding to the at least part of transmission beams.

17. The base station according to claim 14, wherein the processor is configured to select the transmission beams according to the transmission beam group information, information on receiving capability of each receiving set, and beam information on at least part of transmission beams in each transmission beam group.

18. The base station according to claim 14, wherein the processor is further configured to when a number of the at least part of transmission beams in the transmission beam group is greater than the number of reception beams that can be simultaneously formed in a receiving set corresponding to the transmission beam group, transmit information indicating the transmission beam group to which the transmission beams belong according to the transmission beams selected by the base station.

* * * * *